(12) United States Patent
Ripberger

(10) Patent No.: US 9,047,481 B2
(45) Date of Patent: *Jun. 2, 2015

(54) HIERARCHICAL MULTI-TENANCY MANAGEMENT OF SYSTEM RESOURCES IN RESOURCE GROUPS

(71) Applicant: INTERNATIONAL BUSINESS MACHINES CORPORATION, Armonk, NY (US)

(72) Inventor: Richard A. Ripberger, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/301,477

(22) Filed: Jun. 11, 2014

(65) Prior Publication Data
US 2014/0297689 A1 Oct. 2, 2014

Related U.S. Application Data

(63) Continuation of application No. 12/964,675, filed on Dec. 9, 2010.

(51) Int. Cl.
G06F 17/30 (2006.01)
G06F 21/62 (2013.01)
G06F 21/80 (2013.01)

(52) U.S. Cl.
CPC .............. *G06F 21/6218* (2013.01); *G06F 21/80* (2013.01)

(58) Field of Classification Search
CPC .................................................. G06F 17/30705
See application file for complete search history.

(56) References Cited

U.S. PATENT DOCUMENTS

| | | | |
|---|---|---|---|
| 5,765,154 A | 6/1998 | Horikiri et al. |
| 5,905,245 A | 5/1999 | Tanaka |
| 6,393,485 B1 | 5/2002 | Chao et al. |
| 6,438,705 B1 | 8/2002 | Chao et al. |
| 6,543,690 B2 | 4/2003 | Leydier et al. |
| 7,228,351 B2 | 6/2007 | Arwe |

(Continued)

OTHER PUBLICATIONS

"Home Digital Network Interface Specification With Copy Protection"33 pages, The Society of Cable Telecommunications Engineers (SCTE), 2010.

(Continued)

*Primary Examiner* — Mohammad S Rostami
(74) *Attorney, Agent, or Firm* — Griffiths & Seaton PLLC

(57) ABSTRACT

Establishing hierarchical user management authority for storage resources organized into resource groups in a computing storage environment are provided. Each storage resource is associated with a resource group and storage resource object having a resource group attribute associating the storage resource object with one of the resource groups. The resource group label attribute is assigned to the resource group object. An additional attribute of the resource group object, that specifies management policies for the resource group object and the storage resources associated with the resource group object, is defined. One of the available users of the storage resources is associated with a user resource scope attribute. A schema is defined for comparing of values of the user resource scope attribute with the resource group label attribute. The resource group label attribute is designated as a delimited text string for assigning the resource group label attribute to the resource group object.

21 Claims, 17 Drawing Sheets

(56) References Cited

U.S. PATENT DOCUMENTS

| | | |
|---|---|---|
| 7,340,646 B2 | 3/2008 | Haustein et al. |
| 8,495,067 B2 | 7/2013 | Ripberger |
| 2006/0064313 A1 | 3/2006 | Steinbarth et al. |
| 2006/0069889 A1 | 3/2006 | Nagaya et al. |
| 2007/0067366 A1 | 3/2007 | Landis |
| 2007/0143292 A1* | 6/2007 | Nozaki et al. ............... 707/9 |
| 2008/0095339 A1 | 4/2008 | Elliott et al. |
| 2008/0168473 A1 | 7/2008 | Armstrong et al. |
| 2009/0292843 A1 | 11/2009 | Haban et al. |
| 2011/0055892 A1* | 3/2011 | Wang et al. ............... 726/3 |
| 2012/0011141 A1* | 1/2012 | Park et al. ............... 707/769 |

OTHER PUBLICATIONS

"SW USB Series—Two and Four Input USB Switches" 4 pages, 2008, Extron Electronics.

Anderer et al., "Multimedia Magic: Moving Beyond Text" pp. 1-3 ACM 978-1-59593-634-09/07/0010, 2007.

Chong, et al, "Secure Web Applications via Automatic Partitioning" pp. 31-44 ACM 978-1-59593-591-5/07/0010, 2007.

Janssen et al, "Issues in Relationshiip Management for Obtaining the Benefits of a Shared Service Center" pp. 219-228 ACM 1-58113-930-06/04/10, 2004.

Kin et al., "A Technique for QoS-based System Partitioning" pp. 241-246 IEEE ISBN 0-7803-5974-7, 2000.

* cited by examiner

HIERARCHICAL MULTI-TENANCY MANAGEMENT OF SYSTEM RESOURCES IN RESOURCE GROUPS

CROSS-REFERENCE TO RELATED APPLICATION

This application is a Continuation of U.S. patent application Ser. No. 12/964,675, filed on Dec. 9, 2010, the entire contents of which are incorporated herein by reference and is relied upon for claiming the benefit of priority.

BACKGROUND OF THE INVENTION

1. Field of the Invention

The present invention relates in general to computers, and more particularly to apparatus, method and computer program product embodiments for establishing hierarchical user management authority of storage resources organized into a plurality of resource groups in a computing storage environment.

2. Description of the Related Art

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed to provide storage for a number of host systems. Each host system provides one or more host logical partitions that are each capable of running an operating system that supports running one or more applications. Each host logical partition is allowed to access certain storage devices on the data storage subsystems. In this way, a general purpose computing environment allows the processing and storage resources of the configuration to be partitioned and assigned to various workloads associated with one or more applications. In some environments, a set of workloads may be associated with a specific tenant that is using a subset of the computing environment such that there may be multiple tenants that are concurrently running on various subsets within the environment. In this way, a general purpose multi-host system and multi-storage system computing environment can be configured to support multi-tenancy or multiple workloads.

In some situations, data storage is provided locally and also provided to a remote storage environment to enhance data reliability by providing redundancy. In these situations, several instances of data may be stored in multiple locations to provide for failsafe recovery. Storage environments such as network attached storage (NAS) and storage area networks (SAN) allow for these implementations, and for the implementation and maintenance of a larger amount of storage. SAN, NAS and similar systems are increasingly used for supplying a variety of services, such as email, database, applications, and other services. Data storage subsystems also are increasingly supporting the ability to perform outboard replication across SANs, LANs, and WANs to facilitate the replication of data for backup or mirroring purposes.

SUMMARY OF THE DESCRIBED EMBODIMENTS

Most computing environments have configurable attributes that are managed through a user interface. The user interface typically provides a mechanism to authenticate the user through mechanisms such as a user ID and a password. Different users may have different roles such as an administrator, operator, general user, etc. In a system that provides virtualization of resources, logical resources are typically configured from physical resources. The logical resources can be managed within the system via the creation and manipulation of objects in a database that represent the logical resources. As such when a user creates a logical resource, the system remembers that the logical resource exists by creating an object in the database that has attributes that define the logical resource and may also designate the physical resources associated with that object.

As an example of the above description, a storage controller in a computing storage environment may provide for the creation of logical volumes that are accessible by host systems which are created from storage capacity that is available to the storage controller on attached storage devices such as disks or redundant array of independent disk (RAID) arrays. A user creates a logical volume with a given capacity and using a particular type of physical storage through the user interface and the system implementation is such that the logical volume's host address, capacity, and physical storage type are represented in a data structure whose template is defined by a logical volume class and a given instance of this template is referred to as an instance or object of the logical volume class.

In general, it is desirable to provide some mechanism to allow specific users to have access to specific subsets of the object classes in the system configuration. Referring again to the above example, a set of users (A) may be designated to manage the logical volumes created on the storage controller which are to be accessed by a given set of host systems (a). A different set of users (B) may be designated to manage the logical volumes created on the storage controller that are to be a accessed by a second set of host systems (b). It is desirable that the configuration methods of the system provide mechanisms to prevent users in user set (A) from affecting logical volumes that are associated with user set (B) and vice versa.

To facilitate the arbitrary partitioning storage controller resources management subsets, the configuration objects within a given object class may be associated with an object that represents a manageable collection of storage controller resources that will hereafter be referred to as a resource group. The resource group object may also have other attributes that specify that one or more management policies to be applied to the resources assigned to the resource group. For example, there might be one or more logical volumes associated with a resource group, and there might be an attribute in the resource group that indicates that the logical volumes associated with the resource group are not allowed to be used as the target of a copy operation between two volumes. Having created appropriate resource groups with associated resources and policies, it is then possible to designate specific users to have authority to manage specific resource groups.

It is further desirable that such configurations are organized such that specific users may be defined to have authority to manage resources within a limited set of resource groups and to reassign resources within that limited set of resource groups. Additionally, it is desirable that the configuration methods provide a way to authorize specific users to create new resource groups that can be used to further sub-set storage resources within their scope of management such that the new resource groups are constrained to have policies that are at least as restrictive as the resource groups from which storage resources are going to be relocated from. It is further desirable to authorize specific users to have the authority to create user IDs which are constrained to have authority and access scope which is at least as restrictive as the creating user ID's authority. With these capabilities, a multi-level management hierarchy can be created where an individual user at a given level has the ability to sub-divide the resources of that level into additional sub-levels and create user IDs to mange the sub-levels such that the management policies and scope of access applied at any given sub-level is at least as restrictive at the next higher level of the hierarchy. In a multi-tenancy environment, the highest level can be used to partition the computing environment between the individual tenants and the administrative user IDs assigned to the tenant can take further action to create a management hierarchy for the tenant that is limited to the resources and by the policies established at the highest level.

Accordingly, and in view of the foregoing, various system, method, and computer program product embodiments for establishing hierarchical user management authority for storage resources organized into a plurality of resource groups in a computing storage environment are provided. A resource group is a collection of storage resources (e.g. volumes, etc.) than can be assigned a set of policies via the resource group attributes. In one such embodiment, by way of example only, a resource group attribute is included in the storage resource definition to associate a storage resource with one of the plurality of resource groups in a system configuration of the computing storage environment. Each storage resource can be independently assigned to a resource group such that the storage resources can be arbitrarily partitioned into collections that are meaningful subsets for management purposes. Each resource group has a resource group label attribute that uniquely identifiers the resource group. In one embodiment the resource group label is a text string. The resource group label attribute is designated as a delimited text string for assigning the resource group label attribute to the resource group object.

In one embodiment, each of the storage resources is associated with a resource group object by having a resource group attribute on both the resource group and storage resource objects associating the storage resource object with one of the plurality of resource groups. The resource group label attribute is assigned to the resource group object. One or more additional attributes of the resource group object that specify a plurality of management policies for the resource group object and the storage resources associated with the resource group object are defined. One of plurality of available users of the storage resources is associated with a user resource scope attribute. A schema is defined for comparing of a plurality of values of the user resource scope attribute with the resource group label attribute, wherein the at least one of the plurality of available users having authority to perform one of creating, modifying, delete, and managing the storage resources associated with the at least one of the plurality of resource groups and also authority to perform one of creating and modifying at least one of the plurality of resource groups.

The authority to manage at least one of the plurality of resource groups can then be arbitrarily assigned to at least one user of the multiple users via configuration of a user resource scope attribute associated with the user account. Only those of the multiple users assigned a user resource scope that selects at least one of the plurality of resource groups are authorized to perform a management task on the objects assigned to the selected resource groups. In one embodiment, the resource scope is a text sting that specifies a pattern such that a given resource group is within the scope of the resource scope if the pattern in the resource scope matches the string in the resource group label of the resource group.

To further support the establishment of hierarchical user management, in one such embodiment, the set resources groups associated with a particular management hierarchy are explicitly related to one another in a tree structure. Each resource group can be associated with a parent resource group. A resource group that has no parent is referred to as a root resource group. Each resource group in the hierarchy may have any number of child resource groups, and the policies defined in a child resource group are constrained to be a least as restrictive as the policies of the parent resource group. The policies in the child resource group are said to be subordinate to the parent resource group. The resource group labels of the child resource groups are constrained to match all the characters in the parents resource group label and additionally contain at least one additional character such that the child RGL is more specific. The child RGL is said to be subordinate to the parent RGL. For example, the RGL "IBM1" is subordinate to the RGL "IBM".

Furthermore, in one embodiment, the user resource scopes of user IDs are assigned such that the user resource scopes have authority over a given node in the tree of a resource group hierarchy and generally also authority over any descendants of the node the user resource scopes are allowed to manage. For example, consider a hierarchy where the root resource group has an RGL=Pepsi and has child resource groups with RGLs Pepsi.1 and Pepsi.2, respectively; and the Pepsi.1 resource group has child resource groups with RGL's Pepsi.1.1 and Pepsi.1.2, respectively. A user ID with URS=Pepsi* would have access authority to all these resource groups. A user ID with a URS=Pepsi.1* would have access to the Pepsi.1, Pepsi.1.1 and Pepsi.1.2 resource groups.

From this example, it is evident that it is possible to create a storage resource hierarchy with a tree topology where each node of the tree has policies subordinate to all of its ancestors and that it is possible to define a set of user IDs that can manage an arbitrary node within the tree and all of its descendants.

In addition to the foregoing exemplary embodiment, various other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments provide mechanisms for partitioning management of a variety of computing storage resources (possibly spread between multiple interconnected storage subsystems, for example) between multiple users in a manner supporting a user hierarchy. Pursuant to these mechanisms, exemplary embodiments are described that operate to create a hierarchy of resource groups with policies that are monotonically increasing in restrictiveness, to associate users of the computing storage environment's configuration with a user resource scope attribute corresponding to a particular subset of a resource group hierarchy, and assign objects in the system configuration a resource group attribute, as will be further illustrated. Such embodiments function to only allow users with a particularly designated user resource scope attribute to operate on resources in a particularly designated subset of the resource group hierarchy, thus allowing a hierarchically organized set of users to be limited to the management of a specific subset of configuration objects. Furthermore, exemplary embodiments are described that assign authorities to specific user IDs to extend the resource group hierarchy by creating additional child resource groups within the scope of their user resource scope and to move resources between resource groups within the scope of their URS. Also, further exemplary embodiments assign authorities to specific user IDs to create other user IDs with user resource scopes that are limited to the scope of the creating user ID and that are limited to specific access authorities defined for the creating user ID. Such embodiments function to allow each level within the user hierarchy to further extent the management hierarchy to lower levels by reassigning the storage resources within their authority between their current level and lower levels and thereby authorize lower level users to manage that subset of the storage resources.

Figure 1:
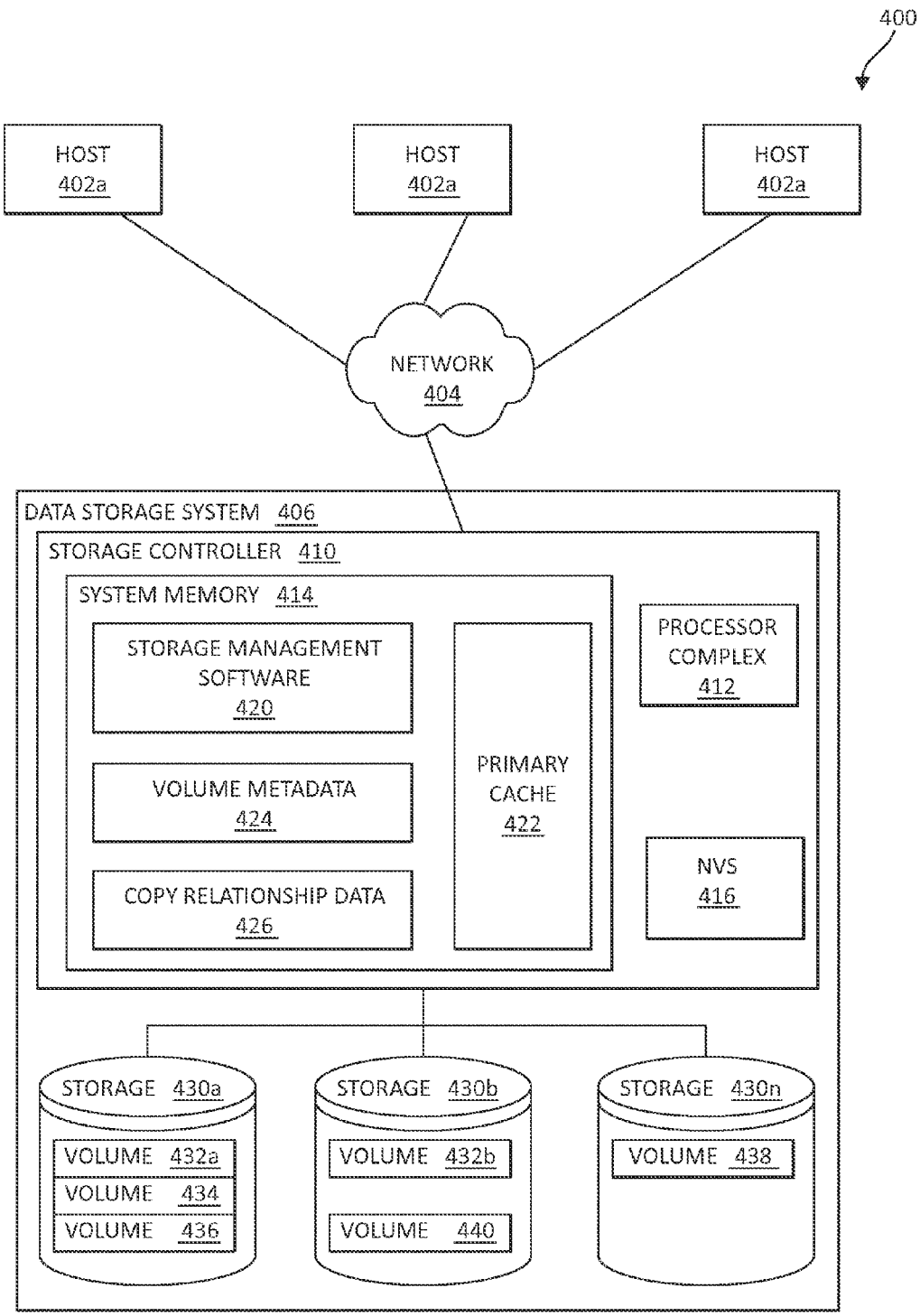
FIG. 1 is a block diagram illustrating a portion of an exemplary computing storage environment.

In reference to FIG. 1, one exemplary embodiment 400 of a computing environment including a data storage system 406 is illustrated in block diagram form and represents an exemplary computing environment for implementing the methods described herein. A network 404 connects one or more hosts 402 with a data storage system 406. Data storage system 406 receives input/output requests for writing/reading data from hosts 402, also referred to herein as a "write request" and "read request," and thereby serves as a networked storage resource for hosts 402. In one embodiment, data storage system 406 is implemented as IBM® System Storage™ DS8000™. Network 404 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. Hosts 402 may be local or distributed among one or more locations and may be equipped with any type of fabric or network adapter (not shown in FIG. 1) to network 404, such as Fibre channel, FICON, ESCON, Ethernet, fiber optic, wireless, or coaxial adapters. Data storage system 406 is accordingly equipped with a suitable fabric or network adapter (not shown in FIG. 1) to communicate via network 404. Data storage system 406 is depicted in FIG. 1 comprising storage controller 410 and storage 430.

To facilitate a clearer understanding of the methods described herein, storage controller 410 is shown in FIG. 1 as a single processing unit, including processor complex 412, system memory 414 and nonvolatile storage ("NVS") 416, which will be described in more detail below. It is noted that in some embodiments, storage controller 410 is comprised of multiple processing units, each with their own processor complex and system memory, and interconnected by a dedicated network within data storage system 406. Storage 430 may be comprised of one or more storage devices, such as storage arrays, which are connected to storage controller 410 by a storage network.

In some embodiments, the devices included in storage 430 are connected in a loop architecture. Storage controller 410 manages storage 430 and facilitates the processing of write and read requests intended for storage 430. The system memory 414 of storage controller 410 stores program instructions and data which processor complex 412 may access for executing functions and method steps associated with managing storage 430. In one embodiment, system memory 414 includes storage management software 420 for executing storage management functions, including the methods and operations described herein. In some embodiments, system memory 414 is allocated for storing volume metadata 424 and copy relationship data 426, which are used for implementing certain virtualization mechanisms, described further below. As shown in FIG. 1, system memory 414 may also include a primary cache 422 for storage 430, also referred to herein as a "cache memory", for buffering "write data" and "read data", which respectively refer to write/read requests and their associated data. In one embodiment, primary cache 422 is allocated in a device external to system memory 414, yet remains accessible by processor complex 412 and serves to provide additional security against data loss, as will be described in detail with respect to FIG. 2 below.

In some embodiments, primary cache 422 is implemented with a volatile memory and coupled to processor complex 412 via a local bus (not shown in FIG. 1) for enhanced performance of data storage system 406. The NVS 416 included in data storage controller is accessible by processor complex 412 and serves to provide additional security against data loss, as will be described in detail with respect to FIG. 2 below. NVS 416, also referred to as a "persistent" cache, or "cache memory", is implemented with nonvolatile memory that may or may not utilize external power to retain data stored therein. In some embodiments, a backup power source (not shown in FIG. 1), such a battery, supplies NVS 416 with sufficient power to retain the data stored therein in case of power loss to data storage system 406. In certain embodiments, the capacity of NVS 416 is less than the total capacity of primary cache 422.

Storage 430 may be physically comprised of one or more storage devices, such as storage arrays. A storage array is a logical grouping of individual storage devices, such as a hard disk. In certain embodiments, storage 430 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

As shown in FIG. 1, a logical volume, or simply "volume," may have different kinds of allocations. Storage 430*a*, 430*b* and 430*n* are shown as ranks in data storage system 406, and are referred to herein as rank 430*a*, 430*b* and 430*n*. Ranks may be local to data storage system 406, or may be located at a physically remote location. In other words, a local storage controller may connect with a remote storage controller and manage storage at the remote location. Rank 430*a* is shown configured with two entire volumes, 434 and 436, as well as one partial volume 432*a*. Rank 430*b* is shown with another partial volume 432*b*. Thus volume 432 is allocated across ranks 430*a* and 430*b*. Rank 430*n* is shown as being fully allocated to volume 438—that is, rank 430*n* refers to the entire physical storage for volume 438. From the above examples, it will be appreciated that a rank may be configured to include one or more partial and/or entire volumes. Volumes and ranks may further be divided into so-called "tracks," which represent a fixed block of storage. A track is therefore associated with a given volume and a given rank.

As mentioned previously, one kind of virtualization mechanism that may be implemented on data storage system 406 is a copy relationship. In a copy relationship, data on one rank may be automatically copied to another rank so that access to data volumes can be provided from two different sources. In one embodiment, a copy relationship involves a physical point-in-time copy operation, in which all the data from source volumes to target volumes are physically copied so that the target volume has a copy of the data as of a point-in-time. In some embodiments, a copy relationship involves a logical point-in-time copy operation, in which a logical copy of the source volume is made, after which data are only copied over when necessary. The logical copy relationship provides the advantageous effect of deferring the physical copying, and is performed to minimize the time during which the target and source volumes are inaccessible.

One example of a copy relationship is known as Flash-Copy®. FlashCopy® involves establishing a logical point-in-time relationship between source and target volumes on different ranks Once the copy relationship is established, hosts may then have immediate access to data on the source and target volumes, and the data may be copied as part of a background operation. Any new modification of data to tracks on the source rank cause those modified tracks on the source rank to be written to the target rank. Reads to any tracks in the cache that have not been updated with modified data from the source causes the source track to be staged to the cache before access is provided to the track from the cache. It is noted that write data associated with or transferred as a result of a copy relationship are referred to herein as being "involved" in a copy relationship. Information about the logical tracks of a copy relationship are stored in volume metadata 424.

Figure 2:
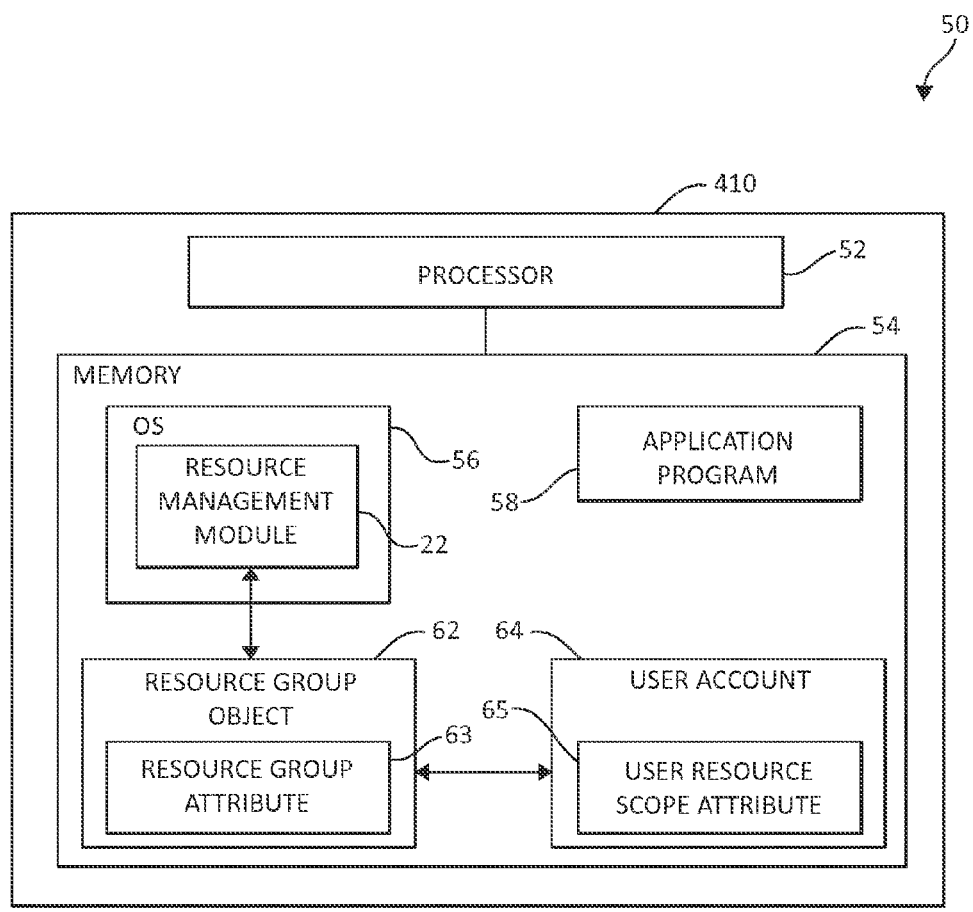
FIG. 2 is a block diagram illustrating an exemplary portion of a management node of the exemplary computing storage environment depicted in FIG. 1.

Turning now to FIG. 2, an exemplary portion 50 of a storage controller 410 as also seen in FIG. 1, previously, is illustrated. Portion 50 of storage controller 410 is operable in a computer environment as a portion thereof, in which mechanisms of the following illustrated embodiments may be implemented. It should be appreciated, however, that FIG. 2 is only exemplary and is not intended to state or imply any limitation as to the particular architectures in which the exemplary aspects of the various embodiments may be implemented. In one embodiment, the functionality of the Resource Group Manager may be located in the storage nodes rather than the management node. Many modifications to the architecture depicted in FIG. 2 may be made without departing from the scope and spirit of the following description and claimed subject matter.

In the illustrated embodiment, portion 50 includes a processor 52 and a memory 54, such as random access memory (RAM). The portion 50 may be operatively coupled to several components not illustrated for purposes of convenience, including a display, which presents images such as windows to the user on a graphical user interface, a keyboard, mouse, printer, and the like. Of course, those skilled in the art will recognize that any combination of the above components, or any number of different components, peripherals, and other devices, may be used with the portion 50.

In the illustrated embodiment, the portion 50 operates under control of an operating system (OS) 56 (e.g. z/OS, OS/2, LINUX, UNIX, WINDOWS, MAC OS) stored in the memory 54, and interfaces with the user to accept inputs and commands and to present results. In one embodiment of the present invention, the OS 56 facilitates management partitioning functionality according to the present invention. To this end, OS 56 includes a resource group manager 22 as previously described, which may be adapted for carrying out various processes and mechanisms in the exemplary methods described following.

The Resource Manager is the 'application' of interest and is compiled by the manufacturer before being put on the machine. The resource management module program may be written in a programming language such as COBOL, PL/1, C, C++, JAVA, ADA, BASIC, VISUAL BASIC or any other programming language to be translated into code that is readable by the processor 52. In one embodiment, the functionality of the Resource management module may be located in the storage nodes rather than the management node.

Data structures 62 and 64 (resource group object 62, and user account 64, respectively) are shown interactional with the resource group manager 22 in memory 54. Data structure 62 includes one or more resource group attributes 63 (such as a resource group number, a resource group label, and other resource group policy attributes as will be further described). Data structure 64 includes one or more user account attributes 64 (such as a user identification (ID), password, and a user resource scope (URS) as will be further described). A portion of the functionality of the resource group manager 22 is, in one embodiment, to correlate the data structures 62 assigned to a particular storage resource(s), including resource group attributes 63 previously described, and data structures 64 assigned to a particular user account, including the user account attributes 65 previously described.

To further implement and execute mechanisms and processes according to the present invention, OS 56, in conjunction with the resource management module 22, memory 54, processor 52, program 58, data structures 62 and 64, and other computer processing, networking, and storage components, may implement management partitioning mechanisms according to the present invention as will be further described. As one of ordinary skill in the art will appreciate, the mechanisms implemented by resource group manager 22 as presently illustrated may be implemented in various forms and architectures. Accordingly, the illustration of resource management module 22 (as well as data structures 62 and 64) in the present figure is again intended to demonstrate logical relationships between possible computing components in the management node 20, and not to imply a specific physical structure or relationship.

In one embodiment, instructions implementing the operating system 56 and the resource management module 22 are tangibly embodied in a computer-readable medium, which may include one or more fixed or removable data storage devices, such as a zip drive, disk, hard drive, DVD/CD-ROM, digital tape, solid state drives (SSDs), etc. Further, the operating system 56 and the resource management module 22 comprise instructions which, when read and executed by the computing storage environment to perform the steps necessary to implement and/or use the present invention. Resource management module 22 and/or operating system 56 instructions may also be tangibly embodied in the memory 54 and/or transmitted through or accessed by 404 (FIG. 1) via various components. As such, the terms "article of manufacture," "program storage device" and "computer program product" as may be used herein are intended to encompass a computer program accessible and/or operable from any computer readable device or media.

Embodiments of the present invention may include one or more associated software application programs 58 that include, for example, functions for managing a distributed computer system comprising a network of computing devices, such as a SAN or NAS as previously described. Accordingly, processor 52 may comprise one or more storage management processors (SMP). The program 58 may operate within a single computer and/or management node 20 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those of ordinary skill in the art or via proprietary interconnection network that is defined by a given vendor to integrate components comprising a distributed computer system. As one of ordinary skill in the art will appreciate, the management node portion 50 may comprise computing components visible throughout the distributed computer system, such as components conforming to a lightweight directory access protocol (LDAP). In this manner, the data structure 64 may be listed in an LDAP server, for example.

The management node 50 may, in one embodiment, be adapted to define user accounts (having data such as the aforementioned user IDs (user ID), password, user resource scope), and provides a mechanism for the system administrator to assign a particular resource scope to the user account. The functionality of the resource group label and resource scope attributes in relation to the present invention and claimed subject matter will now be further described in more detail.

Each storage resource may be associated with a resource group. Each storage resource object that can be associated with a resource group object has a resource group attribute that contains the resource group number of its associated resource group. The resource group object may have other attributes that define policies relative to how the resources in the resource group can be managed. The resource group object, in turn, may have a resource group label attribute that contains a unique identifier for the resource group. In one embodiment, the resource group label is a text string that is semantically structured to allow hierarchical relationships between the resource groups. The user account information (such as the user ID, for example), in turn, may have a user resource scope attribute that contains a resource scope that can be used to test whether the user has access to a given resource group. The resource scope may be implemented with a similar semantic structure as a resource group label, except that it may contain "wildcard" characters. As such the resource scope specifies a pattern that can be match to the set of resource group labels allowing the resource scope to select a specific subset of the hierarchy of resource groups.

While the following exemplary embodiment of a resource scope and resource group label implementation incorporates the text string previously mentioned, it will be apparent to one of ordinary skill in the art that the semantic structure of the string (or a different implementation entirely) is possible. The following exemplary embodiment "A" may be used to support varying hierarchical relationships between users as will be further explained. In this exemplary embodiment, the slash and the period are used as delimiters. The asterisk(*) is used as a "wild card." A token is defined as at least a portion of the text string that may contain any printable characters other than delimiters or the asterisk(*).

In the embodiment A, the resource group label is a text string including one or more parts separated by a slash delimiter. Each part is called a resource group qualifier. A resource_group qualifier may be null or consist of one or more tokens separated by a period. At least one resource group qualifier must be non-null. Consider the following examples of resource group labels:

| A | /vol | A.B.C/vol1 |
|---|---|---|
| A.23 | a123/vol1 | A1.B2.test/C.d.vol/D/E |

Again referring to exemplary embodiment A, the user resource scope is a text string consisting of one or more parts separated by a slash delimiter. Each part is called a resource scope qualifier. A resource_scope qualifier may be null or consist of one or more tokens separated by a period. At least one resource scope qualifier must be non-null. In addition the last character of the last token of a resource scope qualifier may be an asterisk (*). Consider the following examples of resource scopes:

| * | /* | */* | a*/v* | A1.B2.te*/C.d.vol |
|---|---|---|---|---|
| A1.B2.text/C.d* | A*/C* | a123/vol1 | A.B.C/vol1 | |
| A1.B2.test/C.d.vol | A/B/C | A//C | | |

In one embodiment, by way of example only, when a user with a particular assigned user resource scope (URS) creates a storage resource in the system configuration, the storage resource must be assigned to a resource group whose resource group label (RGL) attribute matches the requesting user's URS attribute value. For example if the user's URS is "IBM*", the user could associate the storage resource he creates with any configured resource group whose RGL matches the "IBM*". RGLs that match "IBM*" include, but are not limited to, "IBM", "IBM123", "IBM.AIX.System3.DB2.Pool3" etc. Once the resource is created, the system ensures that only user IDs that have a user resource scope that matches the RGL attribute value in the resource group associated with a given storage resource are allowed to modify, control, or delete the object representing the storage resource according to the management task to be performed.

In one embodiment, when there is more than one resource group qualifier in a resource group label, each respective resource scope qualifier must match the respective resource group qualifier in order for the resource scope pattern to be considered a match to the resource group label. In this definition, the wild card (asterisk) does not span across a slash delimiter unless it the last character of the resource scope. For example, while A.*/v* matches A.B/v1 or A.B/v1/C, it does to match A.B/C/v1. This refinement removes certain ambiguities that may occur with more generalized pattern matching and allows each resource group qualifier to support an independent domain within the hierarchy as will be discussed later.

Figure 3:
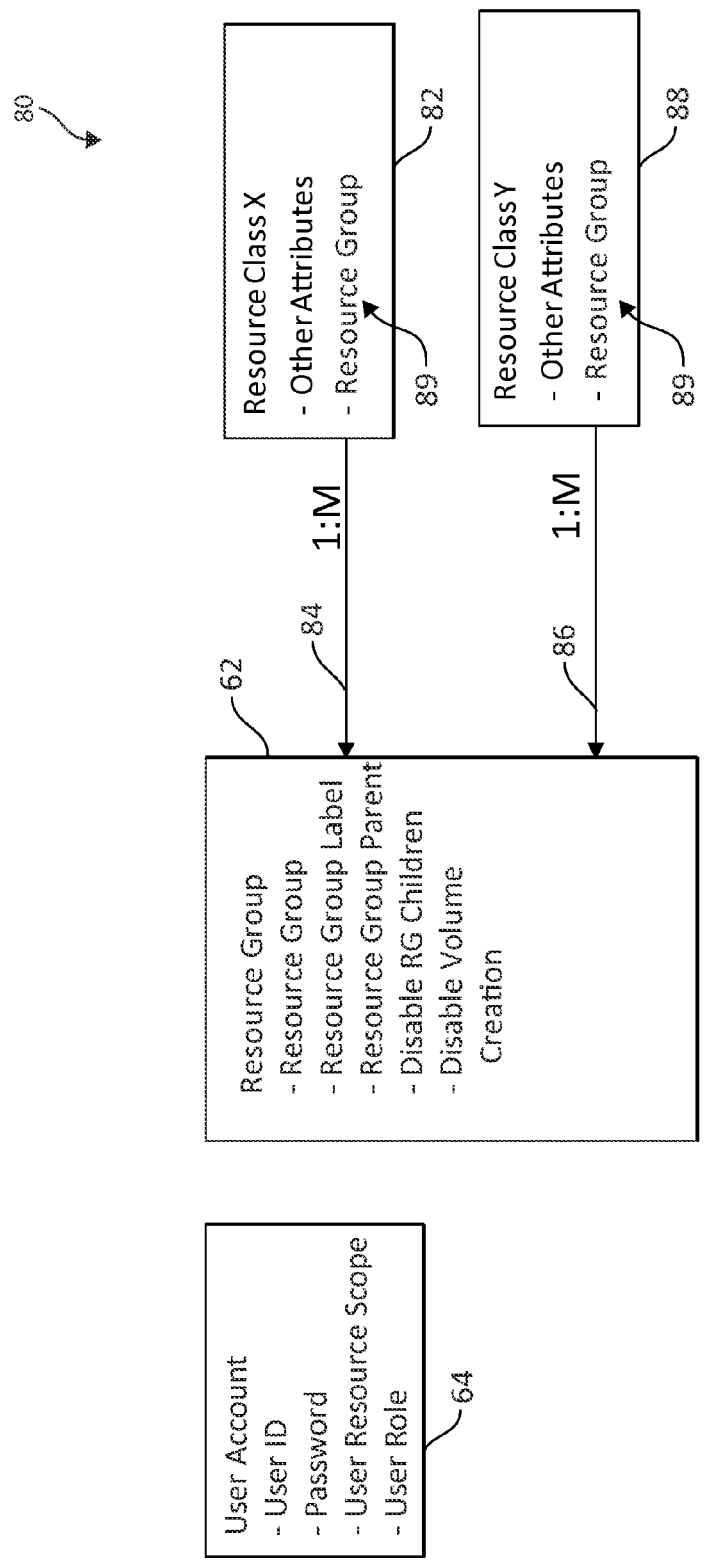
FIG. 3 are tables of exemplary depicting exemplary functionality of resource policy object classes.

Turning now to FIG. 3, a block diagram representing an exemplary relationship 80 between a particular resource group 62 (including the resource group label attribute), the user account 64 (including the user resource scope and user role attribute), and various resource classes 82 and 88 are shown. The resource policy 62 may be supported on varying resource object classes in a 1:M relationship (as denoted by arrows 84 and 86). For example, the resource class 82 or the resource class 88 may correspond to a particular storage resource configuration object type such as, a volume group(s) or a logical volume(s). One of ordinary skill will appreciate, however, that the resource group attribute 89 may be supported on other storage resource object classes.

In view of the above-described object structure in exemplary embodiment A, consider the following examples of object instances with the below-designated attributes:
Resource Group:
  Resource Group=1
  Resource Group Label="A.B.C/vol. 23"
Resource:
  Logical Volume=123
  Resource Group=1
Resource:
  Logical Volume=124
  Resource Group=1
User ID:
  User ID="John"
  User Role="Administrator"
  Resource Scope="A.B*/vol*

The two resource objects are logical volumes, and specifically, logical volumes 123 and 124. Both these resources are associated with resource group 1, which indirectly associates them with resource group label "A.B.C/vol.23". The user ID "John has a user resource scope A.B.*/vol*. Since the user resource scope "A.B.*/vol*" matches the resource group label "A.B.C/vol23" in resource group 1, user ID "John" has authority to manage the resources associated with resource group 1. User ID "John" would also have authority to access resources associated with other resource groups with a resource group label that matched his user resource scope.

Figure 4:
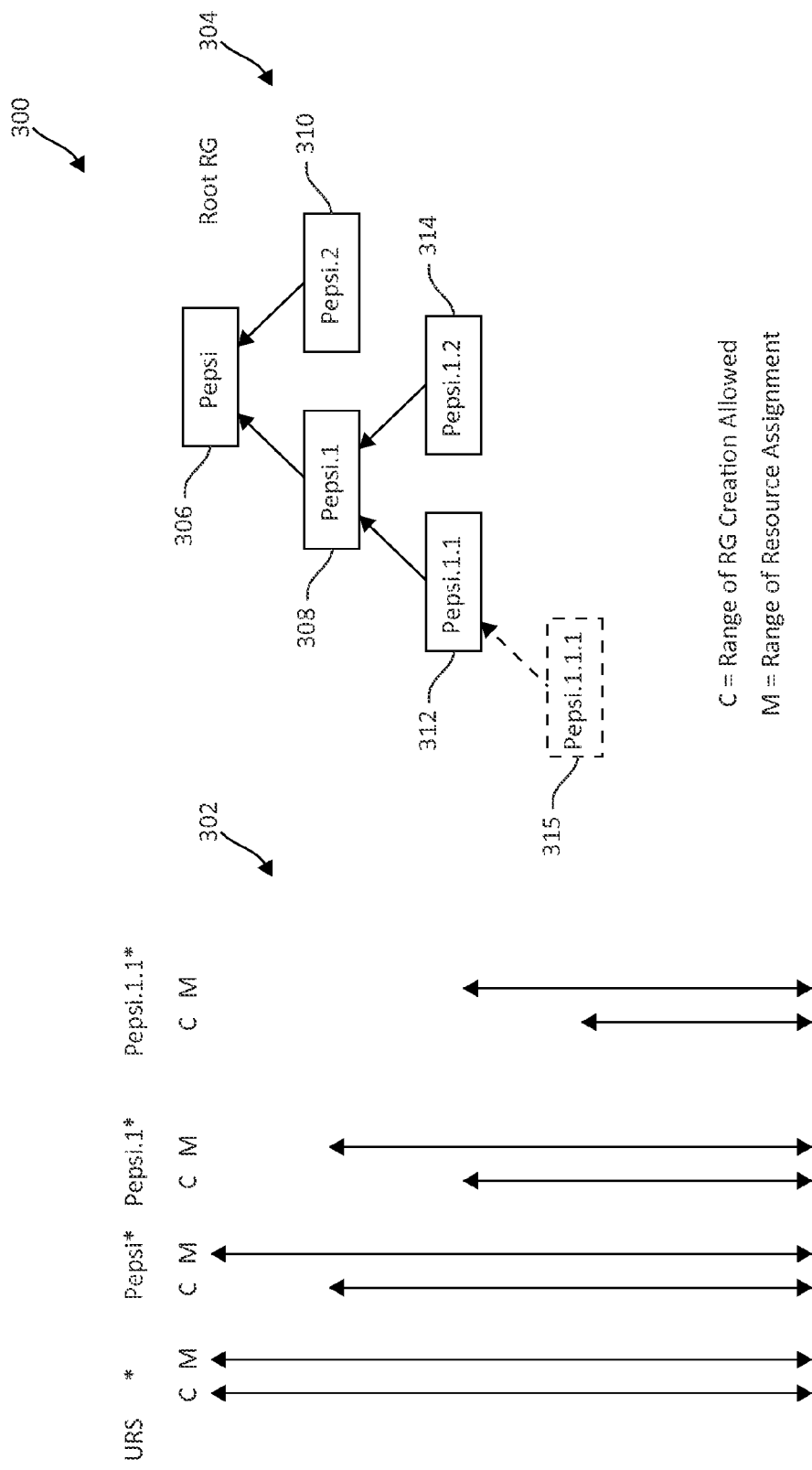
FIG. 4 is block diagram depicting exemplary embodiment for management hierarchy.

In FIG. 3, we further consider the "Resource Group Parent" attribute of the Resource Group object 62 by examining FIG. 4. The resource group parent attribute is set to zero when the resource group does not have a parent indicating that it is a root resource group. The resource group parent attribute is set to a non-zero number when the resource group parent attribute identifies the resource group object that is the parent of this resource group. In FIG. 4, we see from one exemplary embodiment 300 that the resource group with RGL Pepsi (306, FIG. 4), is a root resource group with two children (308 and 310) with RGLs Pepsi.1 and Pepsi.2, respectively. Additionally, Pepsi.1 has two children 312 and 314) with RGL Pepsi.1.1 and Pepsi 1.2 respectively. Any of these resource groups could potentially have additional children, for example as indicated by resource group which is yet to be created with RGL Pepsi.1.1.1 (315, FIG. 4). The policies specified by the other resource group attributes are constrained to be at least a restrictive as the policies specified in its immediate parent resource group 312.

Furthermore in FIG. 4, there are a set of user resource scopes 302 defined, each with two ranges indicated specifying the range within the hierarchy 304 that the user ID is allowed to create or modify a resource group and the range within the hierarchy that the user ID is allowed to specify the resource group attribute of a storage resource that is in a resource group that the user ID has access to. As shown, a user ID with the global resource scope (*) can create, modify or delete, any resource group within the hierarchy including root resource groups, provided the user role is such that it allows it to create a resource group. A user ID with the Pepsi* URS is allowed to create or modify child resource groups of any resource group that has a resource group label that matches Pepsi*. As such, this user ID could create any resource group in this figure other than the root resource group 306 with RGL Pepsi. Additionally this user ID is allowed to reassign storage resources between any of the resource groups that match Pepsi* by modifying the resource group attribute of the particular configuration object associated with the storage resource. Similarly, we see that a user ID with a URL Pepsi.1* is limited to creating or modifying child resource groups of any resource group that matches its URL provided that its user role allows it to create resources groups and can move storage resources between resource groups that have a URL that matches its URS.

The resource group object 62 in FIG. 3 also has a Disable RG Children attribute that can be active or inactive. When active, no user ID is allowed to create a descendent of this resource group. In this way, a user ID that has the authority to create or modify a given resource group in the hierarchy can disable the creation of descendent resource groups to this resource group by any user ID that has the authority to create a child of the resource group.

The resource group object 62 in FIG. 3 also has a Disable Volume Creation attribute that can be active or inactive. When active, no user ID is allowed to create volumes in the resource group. In this way, a user ID that has the authority to create or modify a given resource group in the hierarchy 304 can disable the creation of volumes to this resource group by any user ID that has access the resource group. Since children of a resource group must have at least as restrictive policies as their immediate parent, this control also effectively disables the creation of volumes in all resource group descendants of this resource group. Thus the creator of the resource group may control assignment of volume resources to the resource group, while allowing the user IDs with access to the resource group to have the ability to manage the resources that are placed in the resource group, but deny them the ability to add additional resources to the subset of the resource group hierarchy that they have access to. This capability may be necessary in a multi-tenancy environment for a number of reasons including to control allocation of capacity between tenants at the highest level.

Figure 5:
FIG. 5 is a block diagram depicting exemplary embodiment for user management roles.

In FIG. 5, an exemplary set 500 of user roles are defined that are sufficient to support the operation of the management hierarchy as described by FIG. 4. The exemplary set 500 include a role 502, access authorities 504, and user resource scope 506 column describing the exemplary set 500. The administrator role has a global resource scope (*) and has the authority to create, modify or delete any resource group and any storage resource. These user IDs also have the authority to create any user IDs and assign any user role or user resource scope to the user IDs created. As such, the administrator role has sufficient authority to create, modify, and delete any part of the storage subsystem configuration and to create, modify or delete any user ID within the management hierarchy. Such a role has the authority to partition the storage subsystem between the tenants of a multi-tenancy environment by creating a root resource group and one or more user IDs with a user administrator role for each supported tenant.

The user administrator role can only be assigned to a user ID by a user ID with an administrator role. The user administrator role is assigned a user resource scope and also is specified with a set of user roles, excluding the administrator role, that the user ID is allowed to assign to user IDs it creates. A user ID with the user administrator role allowed to create, delete, or modify user IDs that have a subordinate user resource scope and have a user role that is one of the ones that are assigned to this user ID. In a multi-tenancy environment, a tenant that is provided a user ID with a user administrator role can be allowed to create its own user IDs and the user roles and user resource scopes are limited to a range determined by the administrator that created the user administrator user ID. For example, a user administrator for a Pepsi tenant would likely be given a Pepsi* user resource scope so that any of the tenants user IDs would have a resource scope that is subordinate to Pepsi*, thereby limiting all tenant user accounts to the Pepsi subset of the resource group hierarchy. Additionally, the User administrator ID might be assigned only the roles of User Administrator and Copy Services such that it is allowed to create additional user IDs which may have the User Administrator, Copy Services, or both roles, but not the Operator role.

An operator role is allowed to create, delete, or modify storage resources within the scope of its user resource scope and create resource groups that are children of resources groups within the scope of its user resource scope. The role also includes the authority to modify the resource group attribute of the storage resource groups within the scope of its user resource group. As such, an operator role is allowed to extend the resource group hierarchy within the range of its URS and reassign resources within that subset of the resource group hierarchy. Such operation supports the dynamic creation of additional levels within the hierarchy by a given tenant in a multi-tenancy environment such that management of specific storage resources can be delegated to user IDs that have user resource scopes that are associated with the additional levels created.

A copy services role is limited to initiating copy services operations on storage resources within its user resource scope. The requested copy services operations may be further prescribed by other policies within the resource group associated with the storage resource(s) affected by the request as has been described in other patent applications.

Figure 6:
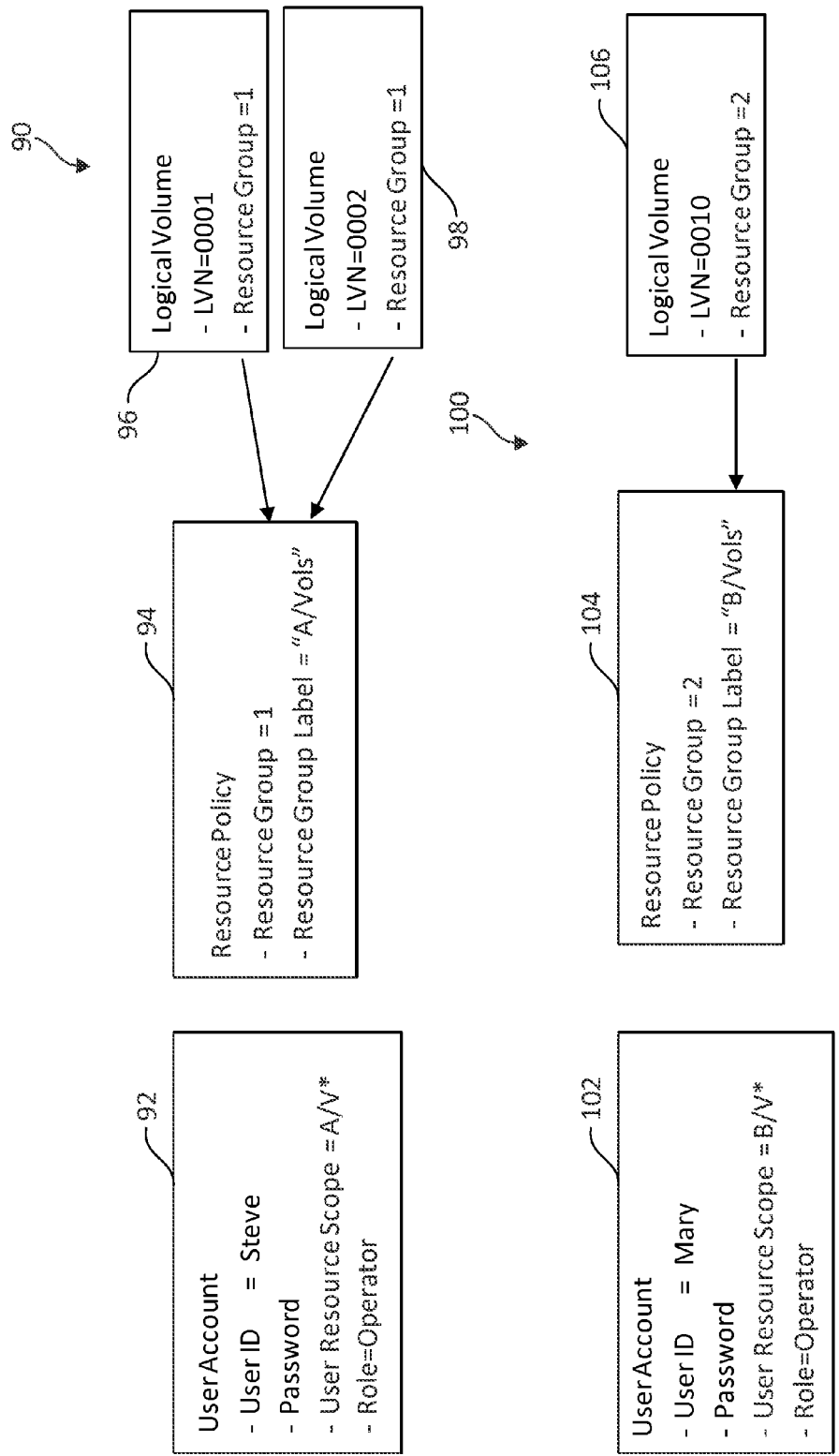
FIG. 6 is an additional block diagram depicting an exemplary operation of resource policies according to one embodiment of the present invention.

Turning now to FIG. 6, additional examples 90 and 100 of resource group operation is shown for user accounts "Steve" and "Mary," respectively. As is depicted for example 90, user account 92 includes user ID "Steve," with an accompanying password, user role of operator and user resource scope attribute of A/V*. A resource group (designated by reference 94) having resource group label "A/Vols" is associated with logical volumes 96 and 98 as shown. User account "Steve" is given access to create, modify, or delete logical volumes with Resource Group 1 due to his user resource scope attribute matching Resource Group 1's resource group label attribute and his operator role. "Steve" is not, however, authorized to create, modify, or delete logical volumes associated with Resource Group 2 (as will be further described with reference to user account "Mary" below) due to his resource scope attribute does not match Resource Group 2's resource group label attribute.

As is depicted for example 100, user account 102 includes user ID "Mary," with an accompanying password, user role of operator, and user resource scope attribute of B/V*. A resource group (designated by reference 104) having resource group label "B/Vols" is associated with logical volumes 106 as shown. User account "Mary" is given access to create, modify, or delete logical volumes with Resource Group 2 due to her user resource scope attribute matching Resource Group 2's resource group label attribute and her operator role. "Mary" is not, however, authorized to create, modify, or delete volumes associated with Resource Group 1 due to her user resource scope attribute does not matching Resource Group 1's resource group label attribute.

Figure 7:
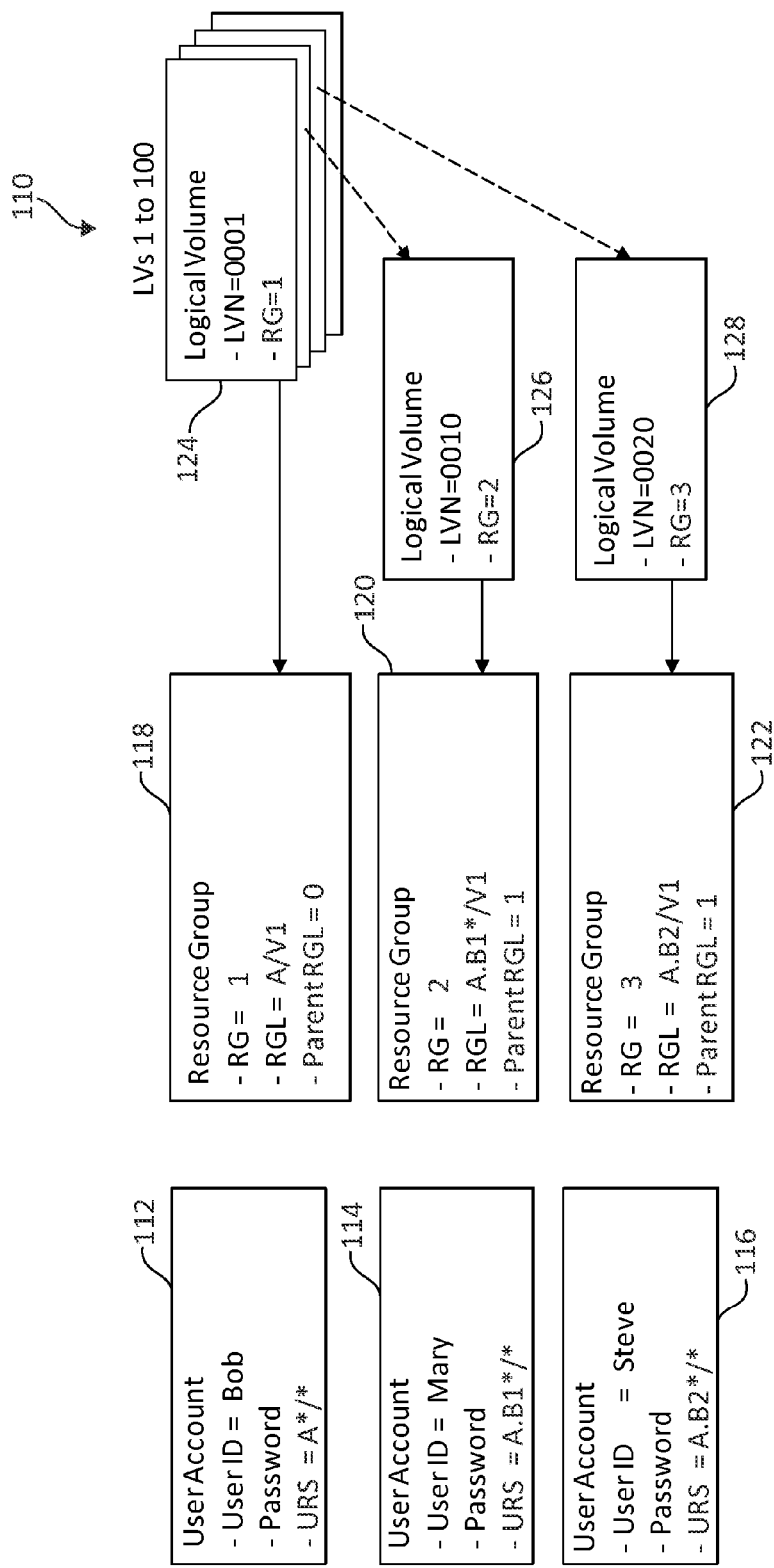
FIG. 7 is an additional block diagram depicting an additional exemplary operation of resource policies according to an additional embodiment of the present invention.

Turning to FIG. 7, an additional exemplary resource group operation 110 is shown in a hierarchical form for logical volume storage resources, in view of the foregoing discussion. User accounts "Bob" (block 112), "Mary" (block 114), and "Steve" (block 116) are shown. In addition, several resource groups 118, 120, and 122 are shown, with associated logical volumes 124, logical volume 126, and logical volume 128 as shown. As was previously depicted in FIG. 6, each resource group 118, 120, and 122 includes a corresponding resource group label attribute, and each of the logical volumes 124, 126, and 128 include a resource group attribute identifying its associated resource group 118, 120, and 122.

In view of the management structure depicted in FIG. 7, and in an exemplary scenario, user account "Bob" is given access to 100 logical volumes corresponding to resource group label A/V1 because his user resource scope is A*/* as shown. "Bob" may then create two resource groups that are children of and subordinate to Resource Group 1 (shown as resource groups 120 and 122). Resource group 120 corresponds to resource group label A.B1/V1, and resource group 122 corresponds to resource group label A.B2/V1. "Bob" may then also move some of the logical volumes 126 (0010) and 128 (0020) from resource group 1 to resource groups 2 and 3, respectively, by changing the resource group attributes on the logical volumes as shown. As a result, user account "Mary" has access to one subset of Bob's logical volumes and user account "Steve" has access to another subset of Bob's logical volumes, as their user resource scopes (A.B1*/* and A.B2*/*, respectively) give them access to the resource groups (A.B1/V1 and A.B2/V1 respectively) to which the logical volumes 126 and 128 are associated.

In the above examples, by convention, the first resource group qualifier and user resource scope qualifier is being used to manage the hierarchy of users and the second resource qualifier is being used to delineate a type of resource or a subset of a type of resources. In other embodiments, an organized hierarchy based on other entities may be realized. For example, the hierarchy may be based on a set of systems of a given type (a certain set of servers, for example), or a set of applications running on that set of systems (payroll, accounting, database, for example). In addition, the installation site that a storage resource, such as a volume, is located may be identified in one of the resource group qualifiers. Finally, another qualifier may be used to define a hierarchy associated with the scopes allowed for copy services relationships. As an example, the resource group label might have a general structure such as "management_hierarchy_qualifier/site.system/application/copy_services_hiearchy_qualifier/resource_type" with a specific instance being "Lev1-A.Lev2-B5.Lev3-23/Site1.AIX/Payroll/Global_Mirror.147/vol"

In addition to the foregoing, the number of tiers in a given hierarchy may be arbitrary, again as one of ordinary skill in the art will appreciate. While the foregoing examples use logical volumes for a storage resource type in one of the resource group label qualifiers, other storage resource types may be similarly implemented, such as logical subsystems, volume groups, performance groups, host ports, and the like. Storage resources may be further designated in a resource group qualifier to indicate other attributes. For example, volume types may be delineated with a resource qualifier such as "vol.thin" or "vol.thick" to designate applicable provisioning, or "vol.ckd.Mod3" for Mod 3-sized check key data (CKD) volumes. As one of ordinary skill in the art will appreciate, any manner of delineating an arbitrary hierarchy of resources (via one of the resource group qualifiers) with an arbitrary subdivision of resources within a given hierarchy node (other resource group qualifiers) is contemplated. Similarly, various policy attributes within the resource group may apply to one or the other type of storage resources and there may be policies which are unique to a given storage type. For example, a policy attribute might control whether storage resources of a given type are allowed to be associated with the resource group.

To facilitate migration from existing implementations without preexisting resource groups to an implementation having resource groups, default attributes may be implemented. In one example, a default Resource Group 0 may include a resource group label attribute "PUBLIC" and its policies may be such that it represents the default behavior of the storage subsystem. In this case, any existing resources are assigned to Resource Group 0, existing administrator user IDs are assigned a global (*) resource scope and any existing non-administrator user IDs are assigned to user resource scope PUBLIC. As such, initially all user IDs have access to all resources. The default resource group is a root resource group.

One or more user accounts may be initialized as an administrator account. The administrator, as a result, may then assign user resource scope and user role attributes to other user accounts. User IDs with a resource scope other than PUBIC (the default scope) correspondingly have access to the resource groups with resource group labels that match their user resource scope and additionally to the resource group PUBLIC.

Figure 8A:
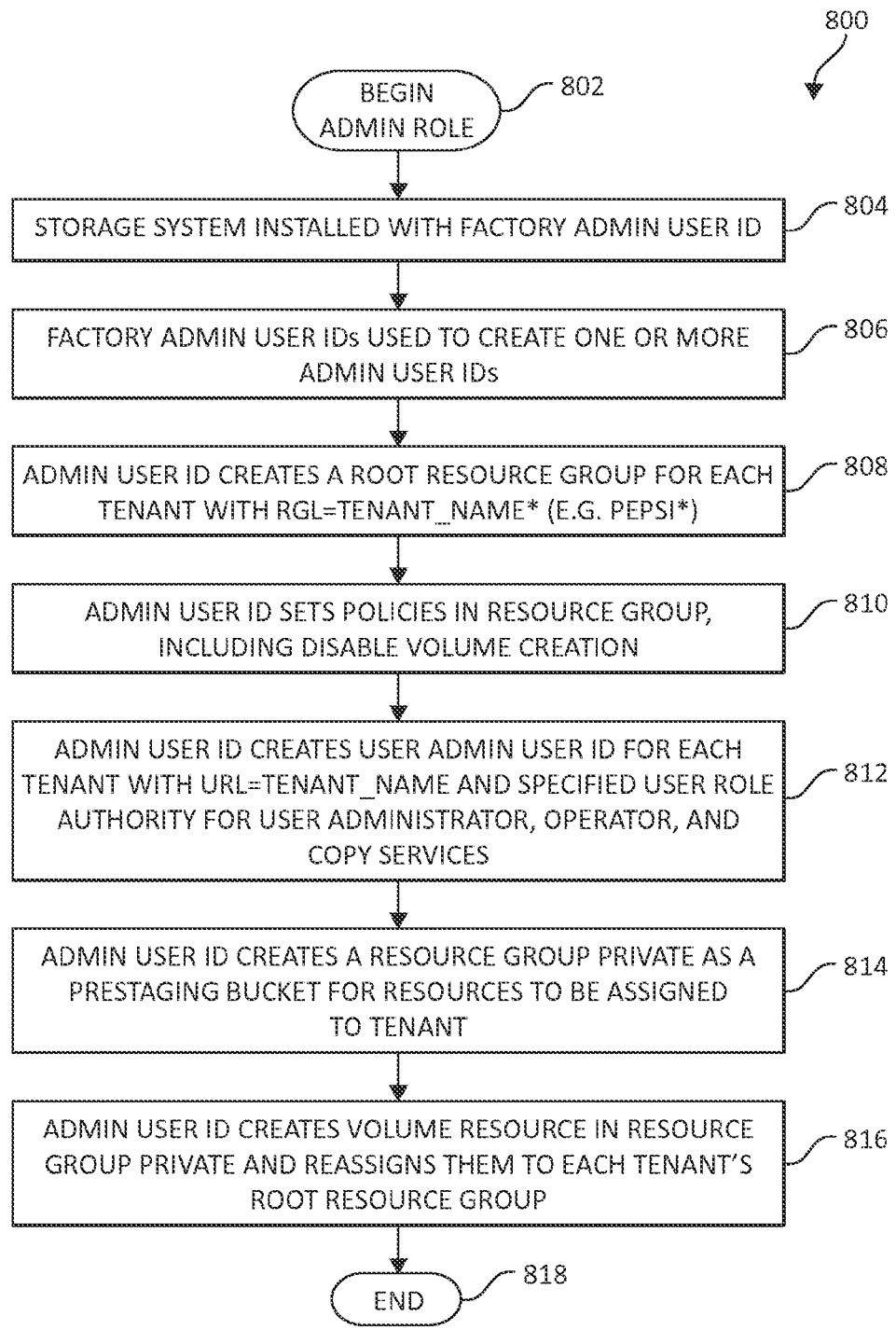
FIG. 8A is a exemplary method of functionality the Admin User IDs according to one embodiment of the present invention.

Turning to FIG. 8A, following, an exemplary method for implementing partitioning hierarchical management authority of system resources in a computing storage environment across multiple tenants and multiple tenant users at multiple levels of a hierarchy is illustrated in flow chart diagram format. In one embodiment of the present invention, the exemplary embodiments create a relationship between a parent resource group and child resource groups such that the child resource groups must have subordinate policy attributes. Furthermore, one exemplary embodiment expands the ability of user IDs, which may be lower in the hierarchy of resource groups, to create child resource groups to expand the resource group hierarchy within the constraints of the parent resource group policies. Such ability is dependent on the existence of there being storage resources associated with resource groups, resource group policies, and user ID with URSs, and additionally a way to non-disruptively add the software code on the machine using default resource groups, default user resource scopes, and some specific default values for some of the policy attributes.

FIG. 8A is an exemplary method 800 of functionality of the Admin User IDs. The method 800 begins (step 802) with the installation of the storage subsystem with the pre-configured Factory Administrator User ID (step 804). The method includes creating one or more other Admin User IDs by the Factory Admin User ID (step 806). Next, a root resource group for each tenant with RGL=Tenant_Name* (e.g Pepsi*) is created by one of the Admin User ID (step 808). The method 800 next sets policies in the resource group by the Admin User ID, including the policy to disable volume creation (step 810). The Admin User ID creates User Admin User IDs for each tenant with URL=Tenant_Name and specified User Role Authority for the User Administrator, Operator, and Copy Services (step 812). As a next step, the method includes the Admin User ID creating a resource group PRIVATE as a prestaging bucket for resources to be assigned to any tenant (step 814). The Admin User ID then creates volume resources in resource Group PRIVATE and reassigns them to each tenant's root resource group (step 816). The method 800 ends (step 818). At this point, each tenant has a set of resources that have been assigned by the administrator to its associated resource group and the tenant it blocked from creating further volumes since in this example, the administrator user IDs want to control the partitioning of capacity between tenants.

Figure 8B:
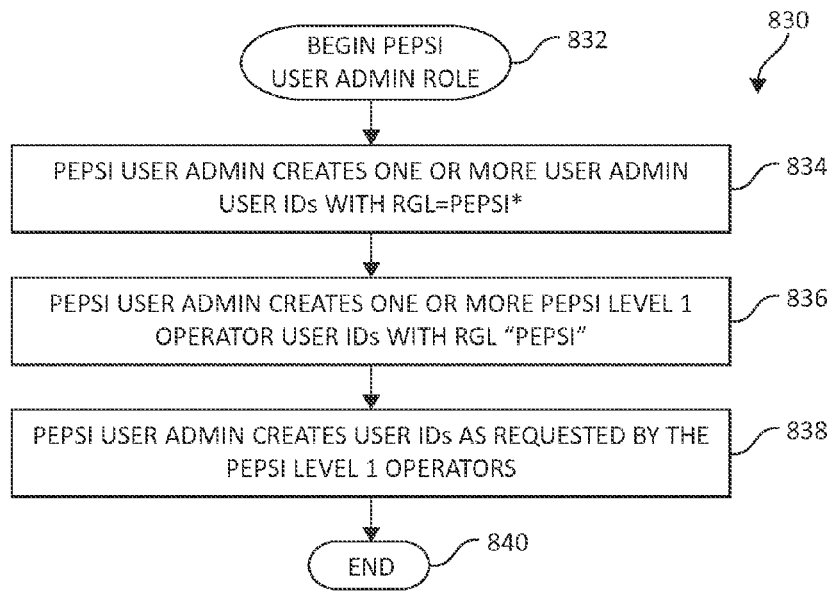
FIG. 8B is an exemplary method of operations for Admin User IDs according to one embodiment of the present invention.

FIG. 8B is an exemplary method 830 of operations for a Tenant's User Admin User IDs. The method 830 begins (step 832) with the Pepsi User Admin Role (which was created in FIG. 9A in step 808). The Pepsi User Admin creates one or more other User Admin User IDs with RGL=Pepsi* (step 834). As a next step of the method, the Pepsi User Admin creates one or more Pepsi Level 1 Operator User IDs with RGL "Pepsi* (step 836) and creates any additional user IDs as requested by the Pepsi Level 1 Operators (step 838). The method 830 then ends (step 840).

Figure 8C:
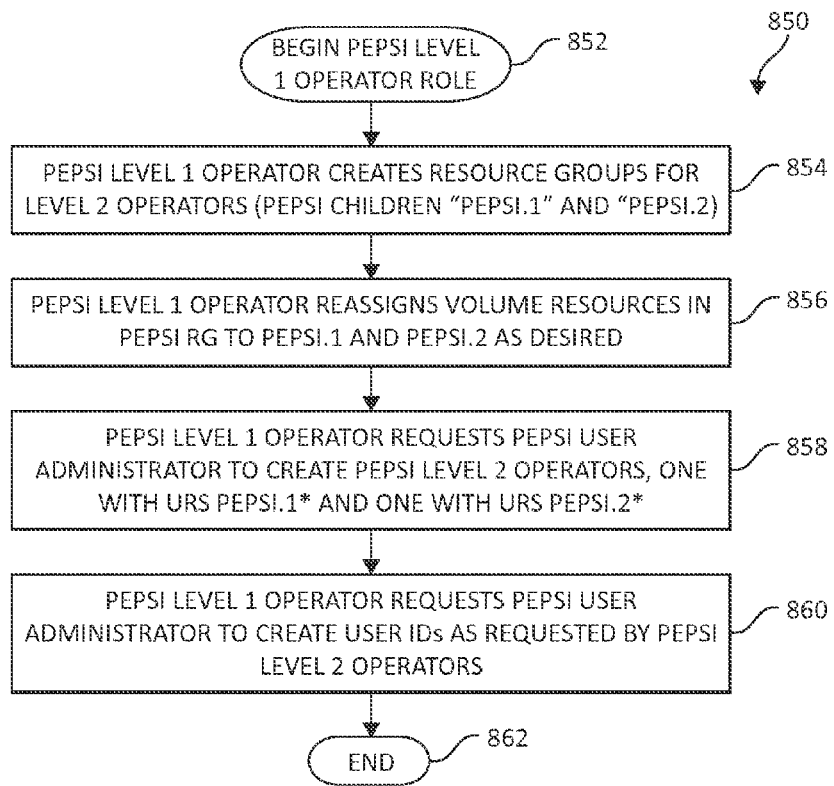
FIG. 8C is an exemplary method of creating child resource groups according to one embodiment of the present invention.

FIG. 8C illustrates an exemplary method 850 of tenant level 1 operator user ID expanding the tenant's resource group hierarchy by creating child resource groups as shown. The method 850 begins (step 852) with the Pepsi Level 1 Operator Role (which was created in FIG. 9B in step 836) The Pepsi Level 1 Operator creates Resource Groups for Level 2 Operators (for example Pepsi Children "Pepsi.1" and "Pepsi.2") (step 854). As a next step, the method 850 includes the Pepsi Level 1 Operator reassigns volume resources in Pepsi RG to Pepsi.1 and Pepsi.2 as desired (step 856). Next, the method 850 includes the Pepsi Level 1 operator requesting Pepsi User Administrator to Create Pepsi Level 2 Operators, one with URS Pepsi.1* and one with URS Pepsi.2* (step 858) which is handled by the Pepsi User Administrator in FIG. 9B step 838. Also the Pepsi Level 1 operator requests the Pepsi User Administrator to Create User IDs as requested by Pepsi Level 2 Operators (step 860). The method 850 then ends (step 862).

Figure 8D:
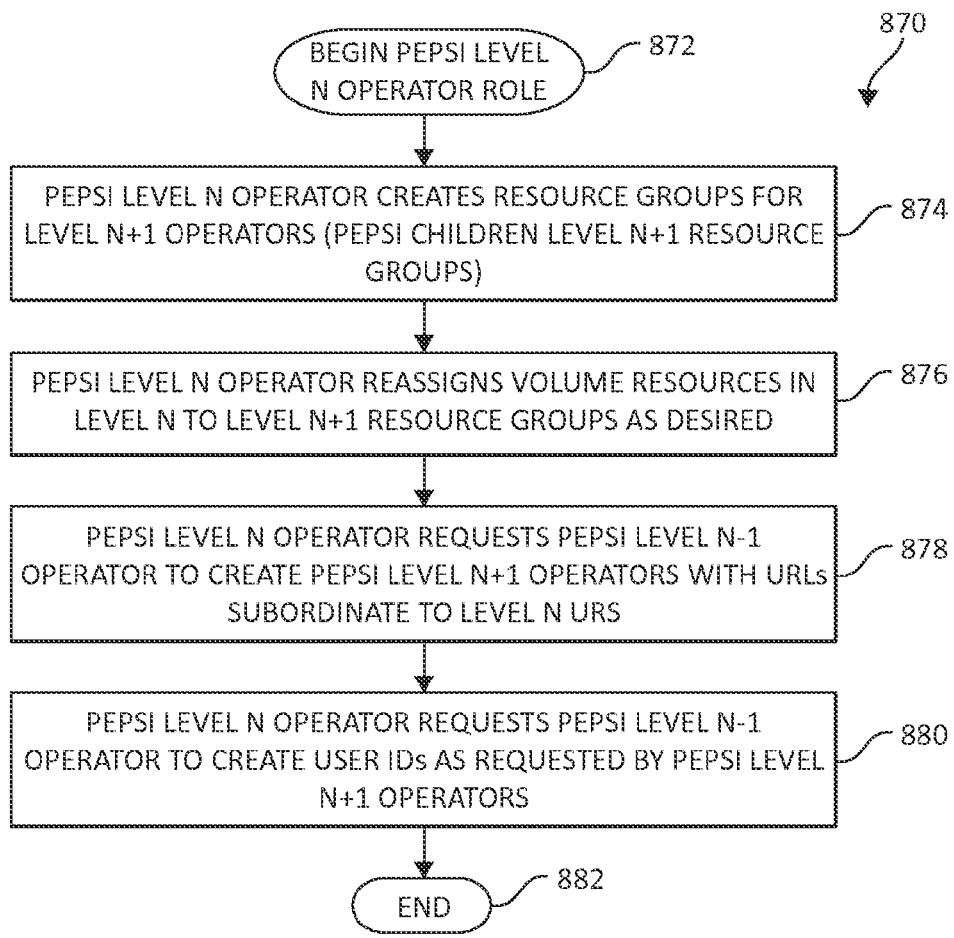
FIG. 8D is an exemplary method of functionality of child resource groups according to one embodiment of the present invention.

Turning now to FIG. 8D, shows an exemplary method 870 of a tenant's level N operator user ID expanding the tenant's resource group hierarchy by creating child resource groups as shown. The method 870 begins (step 872) with the Pepsi Level N Operator Role that was created by the Level N−1 operator (for example in FIG. 9C step 858 for the case of the N=2). The Pepsi Level N Operator creates Resource Groups for Level N+1 Operators (e.g. children of Pepsi Level N+1 Resource Groups) (step 874). As a next step, the Pepsi Level N Operator reassigns volume resources in Level N to Level N+1 Resource Groups as desired (step 876). Next the method 870 includes the Pepsi Level N operator requesting Pepsi Level N−1 Operator to Create Pepsi Level N+1 Operator User IDs with URLs subordinate to Level N URS (step 878) which, for example, is handled by the Pepsi Level 1 in FIG. 9C step 860 in the case of N=2. The Pepsi Level N operator requests Pepsi Leven N−1 Operator to create user IDs as requested by Pepsi Level N=1 Operators (step 880). The method 870 then ends (step 882). Thus, the hierarchy can be arbitrarily extended to as many levels desired by recursively invoke the process in FIG. 8D for each successive level where "N" is incremented by 1 for each successive level.

Figure 9:
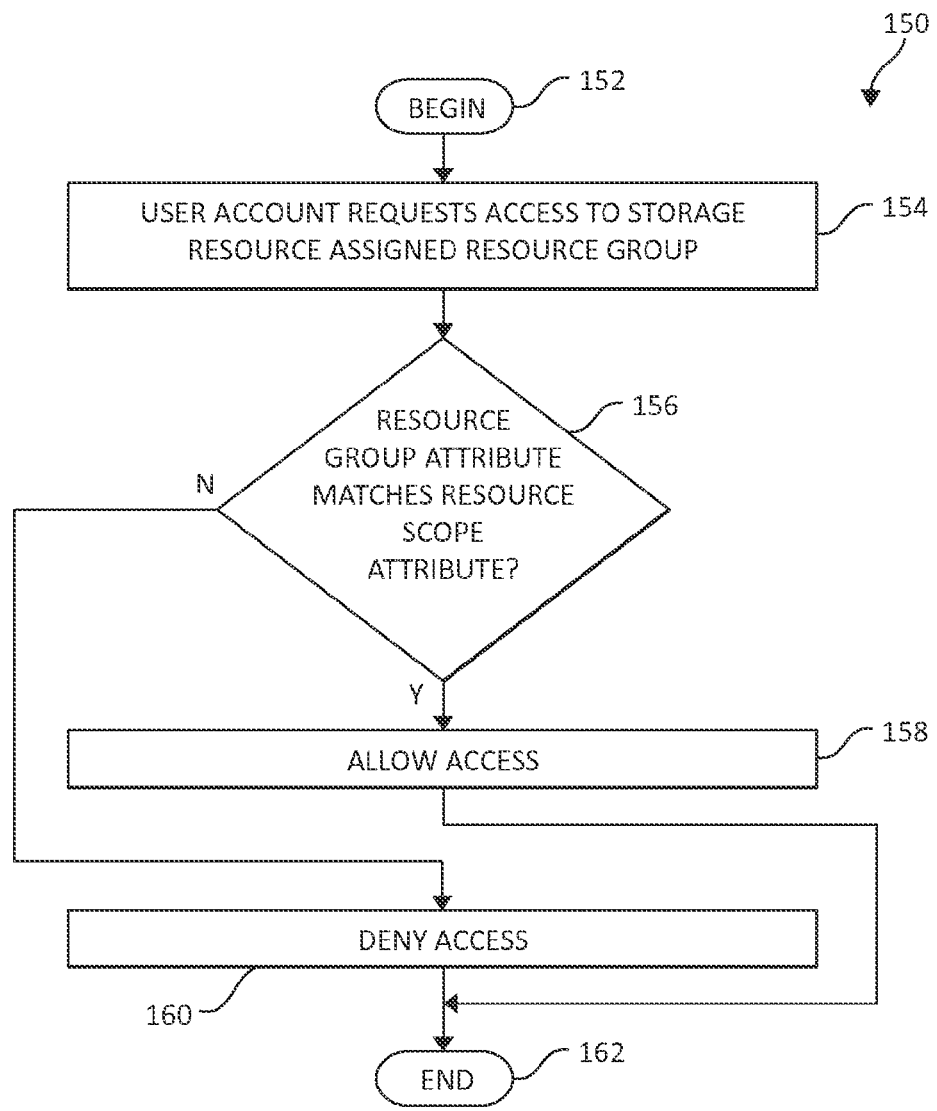
FIG. 9 is a flow chart diagram of an exemplary method of operation of the functionality depicted for validating resource policies according to one embodiment of the present invention.

FIG. 9, following, illustrates an exemplary method 150 of operation of one embodiment of the present invention, relating generally to access of storage resources associated with a resource group by a user ID with an assigned user resource scope. Method 150 begins (step 152) by a user account requesting access to a storage resource assigned a particular resource group (step 154). If the resource group label attribute of the resource group associated with the storage resource matches the resource scope attribute associated with the user account (step 156), access is allowed (step 158). Alternatively, access is denied (step 160). The method then ends (step 162).

Figure 10A:
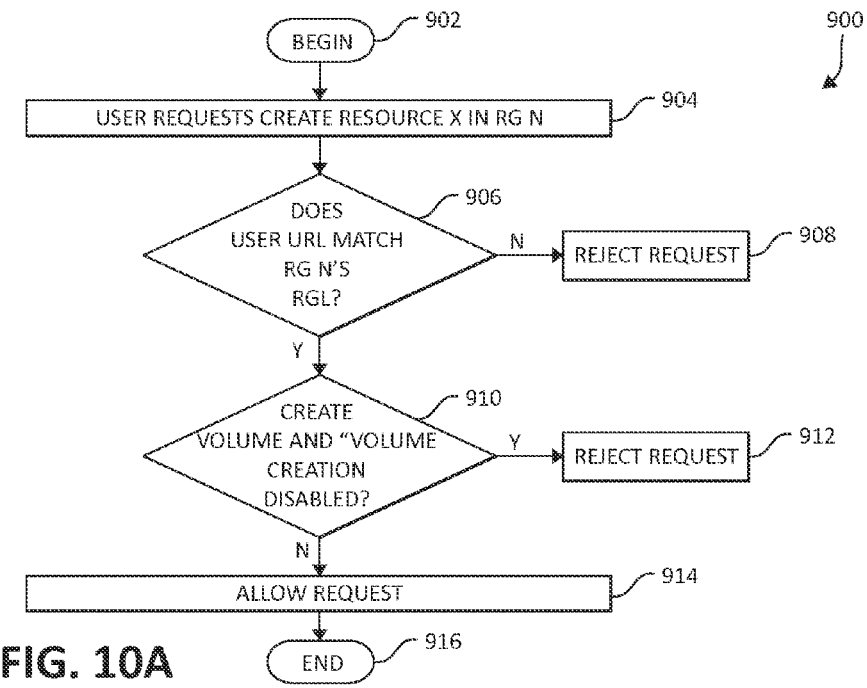
FIG. 10A is an exemplary method creating resource X in Resource Group N according to one embodiment of the present invention.

FIG. 10A shows an exemplary method 900 for a user ID creating a resource X in Resource Group N. Method 900 begins (step 902) with a User requesting to create resource X in RG N (step 904). The method then determines if the User ID's user resource scope (URS) matches resource group (RG) N's resource group label (RGL0 (step 906) and if not, the method will reject the request (step 908). If yes, the method determines whether the request is for the creation of a volume and checks the policies of the resource group to see if volume creation is disabled (step 910) and if yes, the request is rejected (step 912). If not, the request is allowed (step 914). The method then ends (step 916).

Figure 10B:
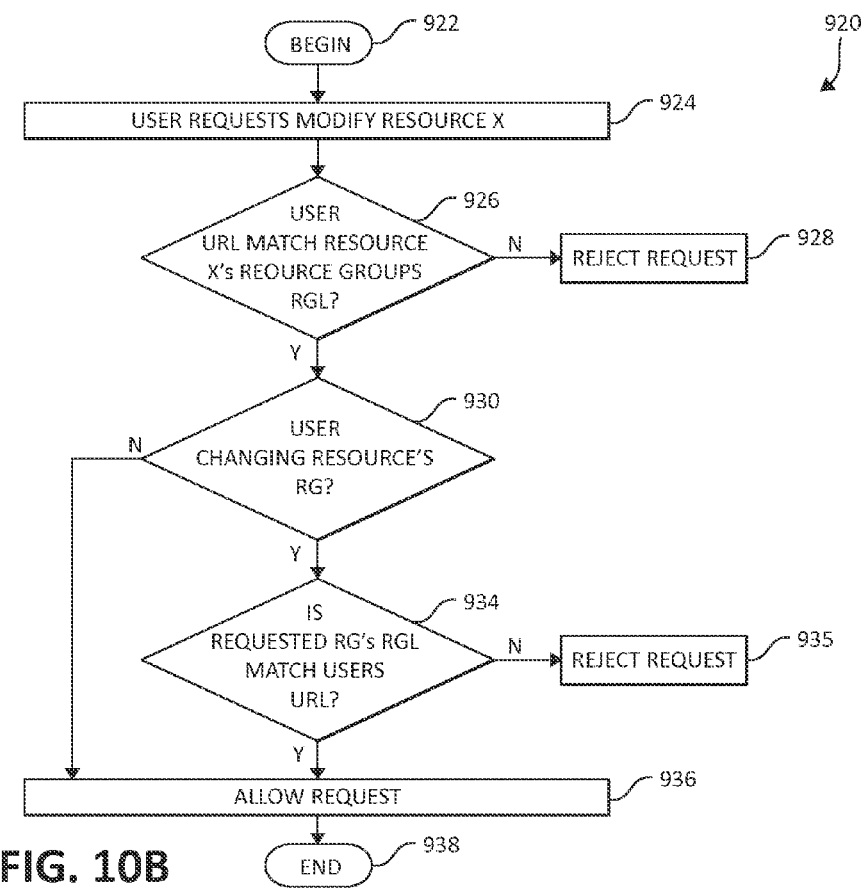
FIG. 10B is an exemplary method of the functionality for a user requesting to modify resource group X according to one embodiment of the present invention.

FIG. 10B is an exemplary method 920 of the functionality for a user ID requesting to modify resource group X. The method 920 beings (step 922) with a user requesting to modify resource X (step 924). The method then checks to see if the User URS match resource X's resource Group's RGL (step 926). If no, the request is rejected (step 928). If yes, the method will check to see if the User is changing the resource RG (step 930). If not, the request is allowed (step 936). If yes, the method will further check if the RG that the user is trying to reassign this resource to has a RGL that match the user URS (step 934). If no, the request is rejected. If the requested RG's RGL match the user URS, the request is allowed (step 936) and the method ends (step 938).

Figure 10C:
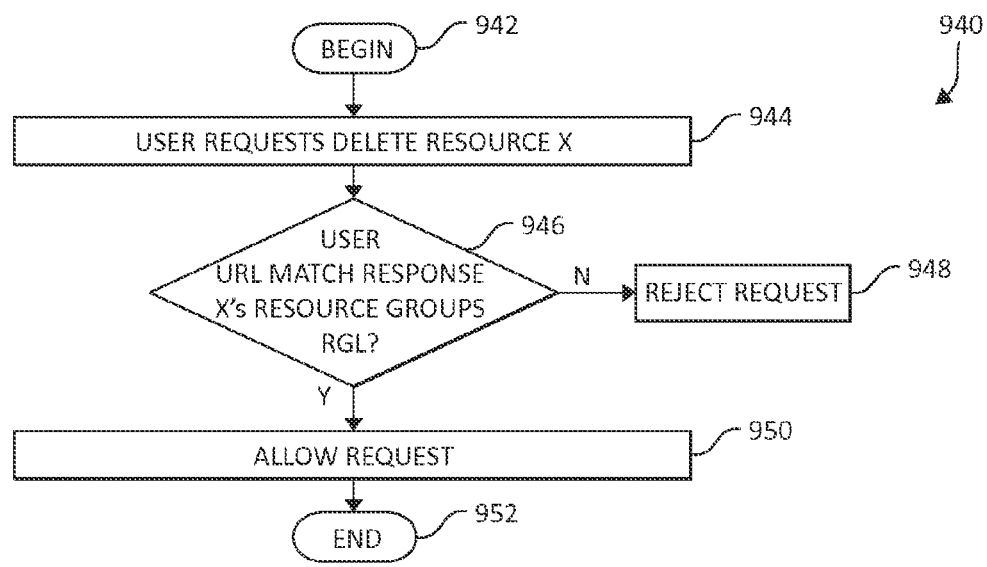
FIG. 10C is an exemplary method of the functionality for a user requesting to delete resource group X according to one embodiment of the present invention.

In reference now to FIG. 10C, an exemplary method 940 of the functionality for a user requesting to delete resource group X is shown. The method 940 beings (step 942) with the User requesting to delete resource X (step 944). The method 940 will check to see if the User URS match resource X's resource group's RGL (step 946). If no, the request is rejected (step 948). If yes, the request is allowed (step 950) and the method 940 ends (step 952).

Figure 10D:
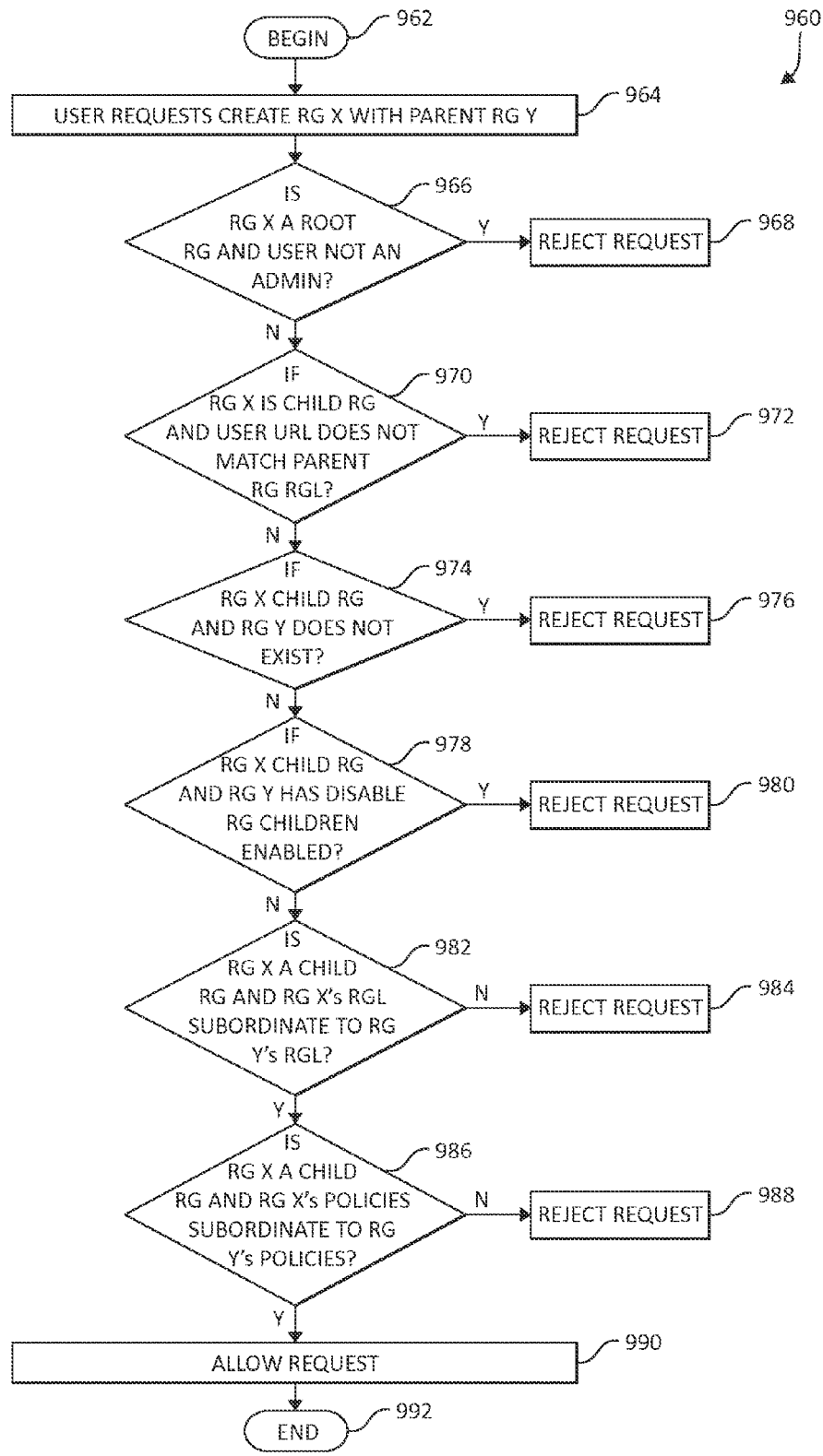
FIG. 10D is an exemplary method of the functionality for a user requesting to create resource group X with parent resource group Y according to one embodiment of the present invention.

Turning now to FIG. 10D, an exemplary method 960 of the functionality for a user requesting to create resource group X with parent resource group Y is now shown. The method 960 beings (step 962) with the User requesting to create RG x with Parent RG Y (step 964). As a next step, the method 960 checks if the RG X is a Root RG (i.e. Parent RG=0) and the User ID does not have an Administrator role (step 966). If yes, the request is rejected (step 968). If not, the method 960 determines if RG x is Child RG (i.e. Parent RG not equal 0) and the User's URS does not match Parent RG's RGL (step 970). If yes, the request is rejected (step 972). If not, the method 960 continues to see if RG x is a Child RG and RG Y does not exist (step 974). If yes, the request is rejected (step 976) and if not, the method will also determine if RG x is Child RG and RG Y is configured with the policy to disable are RG Children (step 978). If yes, the request is rejected (step 980). If not, the method 960 determines whether RG X is a Child RG and if RG X's RGL is subordinate to RG Y's RGL (step 982). If no, the request is rejected (984). If yes, the method 960 determines whether RG X is a Child RG and if RG X's policies are subordinate to RG Y's policies (step 986), If no, the request is rejected (step 988), If yes, the request is allowed (step 990) and the method 960 ends (step 992).

Figure 10E:
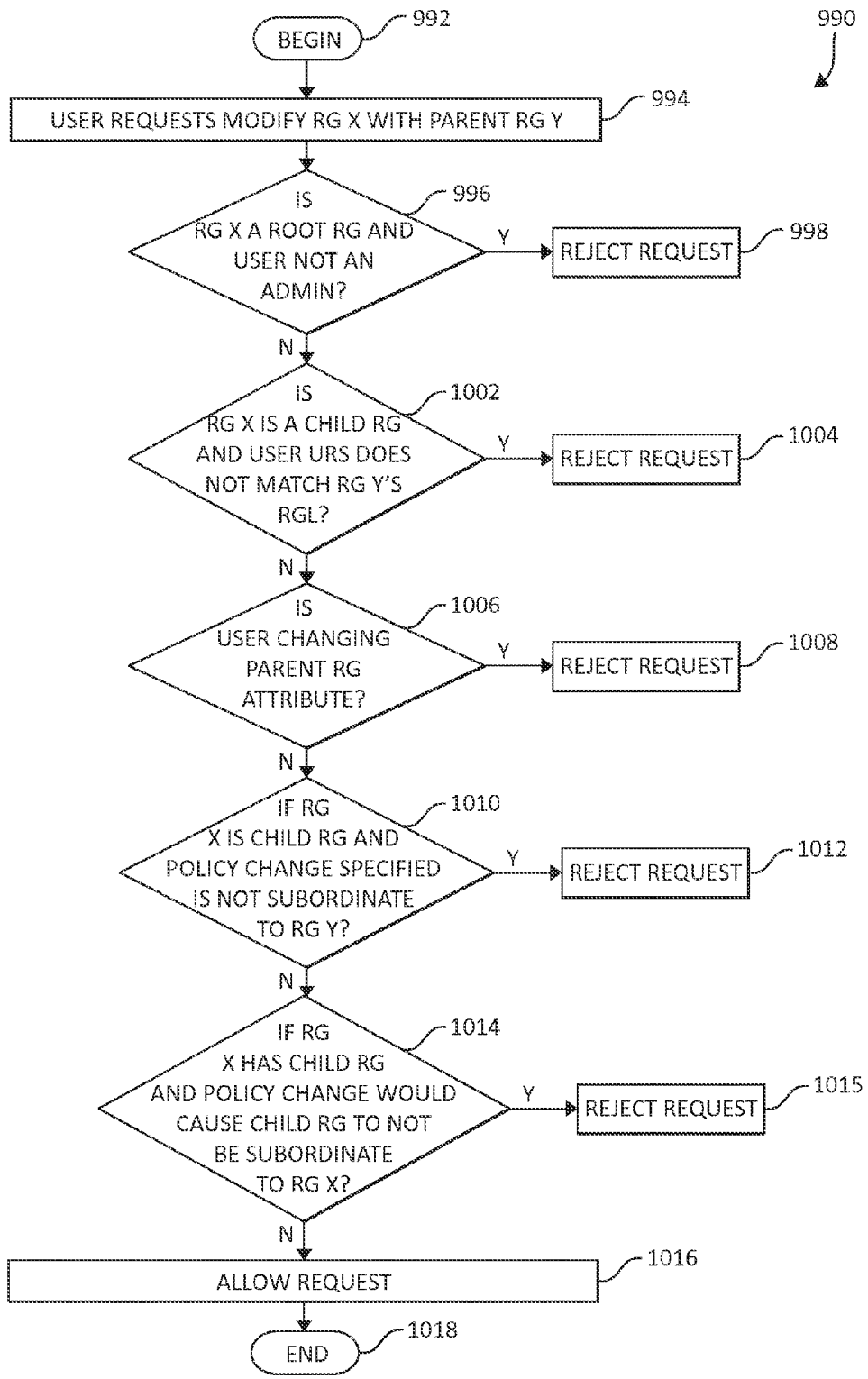
FIG. 10E is an exemplary method of the functionality for a user requesting to modify resource group X with parent resource group Y according to one embodiment of the present invention.

FIG. 10E is an exemplary method 990 of the functionality for user requesting to modify resource group X with existing parent resource group Y. The method 990 beings (step 992) with the User requesting to modify RG x with Parent RG Y (step 994). As a next step, the method 990 determines if the RG x is a Root RG and User are not Administrator (step 996). If yes, the request is rejected (step 998) and if not, the method will check if RG x is Child RG and whether the User URS does not match the parent RG's RGL (step 1002). If yes, the request is rejected (step 1004), but if no, the method will check if the User is changing the Parent RG attribute (step 1006). If yes, the request is rejected (step 1008). If no, the method 990 checks if RG X is a child RG and whether RG X's policies are not subordinate to the parent RG's policies (step 1010). If yes, the request is rejected (step 1012). If no, the method then determines if RG x has Child RG and policy change would causes Child RG to not be subordinate to RG x (step 1014). If yes, the request is rejected (step 1015) and if no, the request is allowed (step 1016). The method 990 then ends (step 1018).

Figure 10F:
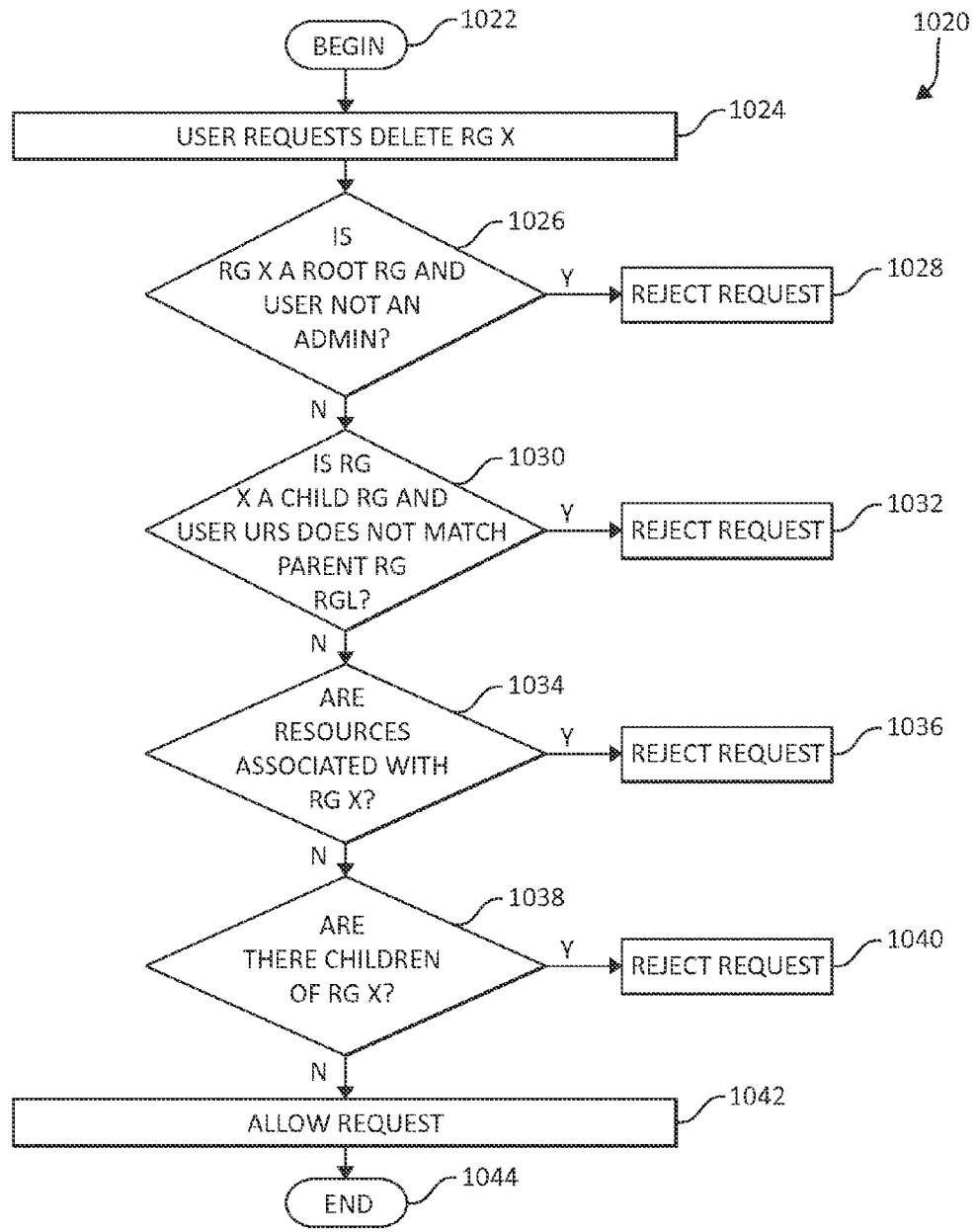
FIG. 10F is an exemplary method of the functionality for a user requesting to delete resource group X with parent resource group Y according to one embodiment of the present invention.

FIG. 10F is an exemplary method 1020 of the functionality for user requesting to delete resource group X with parent resource group Y. The method 1020 beings (step 1022) with the User requesting delete RG (step 1024). The method 1020 continues and determines if the RG X is a Root RG and User is not an Administrator (step 1026) and the method includes rejecting the request if yes (step 1028). As a next step, the method will determine if RG X is a Child RG and User URS does not match the Parent RG RGL (step 1030). If yes, the request is rejected (step 1032), but if not, the method will then check if there are any resources associated with RG x (step 1034). If yes, the request is rejected (step 1036). If not, the method determines if there are Children of RG x (step 1038).

If there are Children of RG x, the request is rejected (step 1040). If not, the request is allowed (step 1042). The method then ends (step 1044).

Figure 10G:
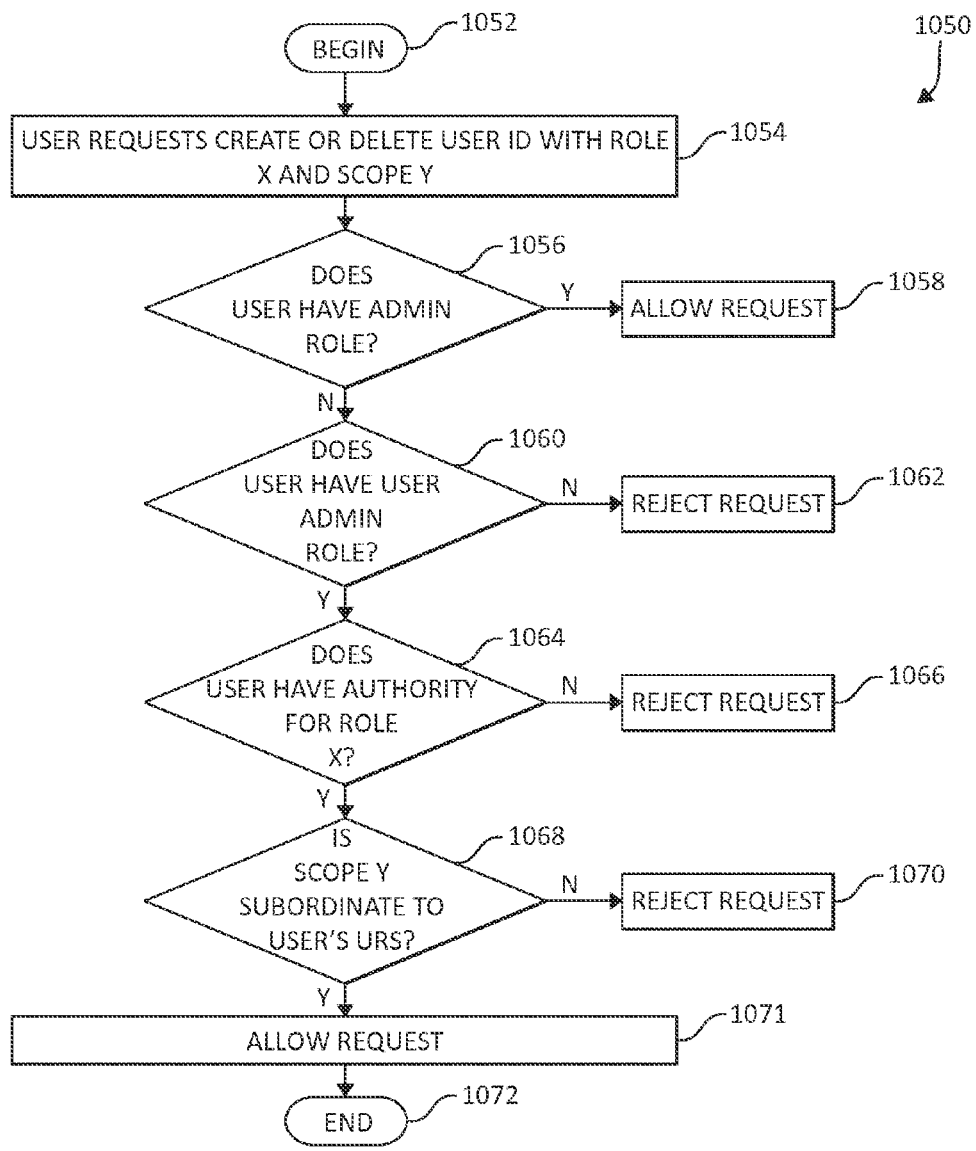
FIG. 10G is an exemplary method of the functionality for a user requesting to create or delete user ID's with role X and scope Y with resource group X and with parent resource group Y according to one embodiment of the present invention.

FIG. 10G is an exemplary method 1050 of the functionality for a user requesting to create or delete a user ID with role X and scope Y. The method 1050 beings (step 1052) with the User requesting to create or delete the User ID with role X and scope Y (step 1054). As a next step the method determines if the requesting user has the Admin Role (step 1056). If yes, the request is allowed (step 1058). If not, the method 1050 continues to determine if the requesting user has the User Admin Role (step 1060). If not, the request is rejected (step 1062). If the user does have a User Admin Role, the method 1050 will determine if the user has authority for role x (step 1064). If not, the request is rejected (step 1066). If yes, the method 1050 continues and determines if the scope Y is subordinate to user's URS (step 1068). If no, the request is rejected (step 1070). If yes, the request is allowed (step 1071). The method 1050 then ends (step 1072).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method of establishing hierarchical user management authority for a plurality storage resources organized into a plurality of resource groups in a computing storage environment by a processor device, comprising:

associating the plurality of storage resources with a resource group object, the resource group object and a storage resource object by having a resource group attribute associating the storage resource object with one of the plurality of resource groups;

assigning a resource group label attribute to the resource group object;

defining at least one additional attribute of the resource group object that specify a plurality of management policies for the resource group object and the plurality of storage resources associated with the resource group object;

associating at least one of a plurality of available users of the plurality of storage resources with a user resource scope attribute;

defining a schema for comparing of a plurality of values of the user resource scope attribute with the resource group label attribute, wherein the at least one of the plurality of available users has authority to perform one of creating, modifying, delete, and managing the plurality of storage resources associated with the at least one of the plurality of resource groups and also authority to perform one of creating and modifying at least one of the plurality of resource groups;

designating the resource group label attribute as a delimited text string for assigning the resource group label attribute to the resource group object;

designating the resource group label attribute as a delimited text string further includes designating the resource group label attribute with at least one resource group qualifier sections, separated by a delimiter symbol;

designating the user resource scope attribute as a delimited text string further includes designating the user resource scope attribute with the at least one resource group qualifier sections, separated by at least one delimiter symbol, wherein the a least one delimiter symbol may include a wild card symbol; and defining a schema for comparing of a plurality of values of the user resource scope attribute with the resource group label attribute further includes comparing the at least one resource group qualifier sections to match with a corresponding one of the at least one resource group qualifier sections, wherein a last one of a at least one resource scope qualify sections is considered to match any subsequent one of the at least one resource group qualifier sections if a wildcard symbol is specified as a last character.

2. The method of claim 1, further including performing at least one of:

associating at least one of the plurality of available users with the user resource scope attribute further includes designating the user resource scope attribute as the delimited text string, wherein at least one symbol is designated with at least one wildcard characteristic, and defining a schema for comparing of a plurality of values of the user resource scope attribute with the resource group label attribute further includes considering a user to have authority to manage the plurality of storage resources associated with at least one of the plurality of resource groups if a text pattern specified by the user resource scope attribute matches the delimited text string specified in the resource group label of the resource group.

3. The method of claim 1, further including performing at least one of:

associating with the at least one resource group qualifier sections with an independent hierarchical domain for a specific management purpose, and associating with the at least one resource group qualifier sections with a user management hierarchy, wherein at least one value of the at least one resource group qualifier sections specifies a different node in the user management hierarchy.

4. The method of claim 1, further including performing at least one of:

assigning a parent resource group attribute to at least one of the resource group object that identifies another one of the plurality of resource groups as a parent of the plurality of resource groups such that a specified one of the plurality of resource groups may be hierarchically related to at least one child resource group, constraining the resource group label attribute of the parent of the plurality of resource groups and the at least one child resource group such that a resource scope may be defined to match a subset of a set of the plurality of resource groups consisting of at least one of the plurality of resource groups and at least one of the descendants of the plurality of resource groups, and requiring the plurality of management policies specified in at least one policy attribute of the at least one child resource group be as restrictive as the plurality of management policies specified in the at least one policy attribute of the parent of the plurality of resource groups.

5. The method of claim 4, further including performing at least one of:

restricting the authority to one of creating and modifying the plurality of resource groups without a parent of the plurality of resource groups to a user ID having a user resource scope attribute that provides access to all of the plurality of resources groups, limiting the authority of performing one of creating and modifying the at least one child resource group with a parent resource group containing the resource group label attribute matching a scope of the users resource scope attribute to the user ID having one of a plurality of resource scopes that does not provide access to all resource groups, and limiting the user ID having one of the plurality of resource scopes without authority to provide access to all of the plurality of resource groups to one of:

changing a plurality of resource group attribute of the plurality of storage resources that are associated with the plurality of resource groups having the resource group label attribute matching the user resource scope attribute and is being assigned to one of the plurality of resource groups having the resource group label attribute that matches the user resource scope attribute.

6. The method of claim 1, further including performing one of:

defining at least one policy attribute of the plurality of resource groups that prevents at least one of creating and associating a specified storage resource class in the plurality of resource groups, and defining a policy attribute of the plurality of resource groups that prevents a creation of a child resource groups.

7. The method of claim 1, further including assigning an authority to an administrative user ID to create at least one user ID with a definition that provides an authority to create another one of the at least one user ID with the user resource scope attribute that is limited by the user resource scope attribute of creating one of the at least one user ID with a user role that is limited to at least one of a set of the user roles assigned to the creating one of the at least one user ID.

8. A system of establishing hierarchical user management authority for storage resources organized into a plurality of resource groups in a computing storage environment, comprising:

at least one processor device;
a resource group manager, controlled by the at least one processor device, operational in the computing storage environment, wherein the resource group manager is adapted for:
associating the plurality of storage resources with a resource group object, the resource group object and a storage resource object by having a resource group attribute associating the storage resource object with one of the plurality of resource groups,
assigning a resource group label attribute to the resource group object,
defining at least one additional attribute of the resource group object that specify a plurality of management policies for the resource group object and the plurality of storage resources associated with the resource group object,
associating at least one of a plurality of available users of the plurality of storage resources with a user resource scope attribute,
defining a schema for comparing of a plurality of values of the user resource scope attribute with the resource group label attribute, wherein the at least one of the plurality of available users having authority to perform one of creating, modifying, delete, and managing the plurality of storage resources associated with the at least one of the plurality of resource groups and also authority to perform one of creating and modifying at least one of the plurality of resource groups,
designating the resource group label attribute as a delimited text string for assigning the resource group label attribute to the resource group object,
designating the resource group label attribute as a delimited text string further includes designating the resource group label attribute with at least one resource group qualifier sections, separated by a delimiter symbol,
designating the user resource scope attribute as a delimited text string further includes designating the user resource scope attribute with the at least one resource group qualifier sections, separated by at least one delimiter symbol, wherein the a least one delimiter symbol may include a wild card symbol, and
defining a schema for comparing of a plurality of values of the user resource scope attribute with the resource group label attribute further includes comparing the at least one resource group qualifier sections to match with a corresponding one of the at least one resource group qualifier sections, wherein a last one of the at least one resource group qualify sections is considered to match any subsequent one of the at least one resource group qualifier sections if a wildcard symbol is specified as a last character.

9. The system of claim 8, wherein the resource group manager is further adapted for performing at least one of:
associating at least one of the plurality of available users with the user resource scope attribute further includes designating the user resource scope attribute as the delimited text string, wherein at least one symbol is designated with at least one wildcard characteristic, and
defining a schema for comparing of a plurality of values of the user resource scope attribute with the resource group label attribute further includes considering a user to have authority to manage the plurality of storage resources associated with at least one of the plurality of resource groups if a text pattern specified by the user resource scope attribute matches the delimited text string specified in the resource group label of the resource group.

10. The system of claim 8, wherein the resource group manager is further adapted for performing at least one of:
associating with the at least one resource group qualifier sections with an independent hierarchical domain for a specific management purpose, and
associating with the at least one resource group qualifier sections with a user management hierarchy, wherein at least one value of the at least one resource group qualifier sections specifies a different node in the user management hierarchy.

11. The system of claim 8, wherein the group manager module is further adapted for performing at least one of:
assigning a parent resource group attribute to at least one of the resource group object that identifies another one of the plurality of resource groups as a parent of the plurality of resource groups such that a specified one of the plurality of resource groups may be hierarchically related to at least one child resource group,
constraining the resource group label attribute of the parent of the plurality of resource groups and the at least one child resource group such that a resource scope may be defined to match a subset of a set of the plurality of resource groups consisting of at least one of the plurality of resource groups and at least one of the descendants of the plurality of resource groups, and
requiring the plurality of management policies specified in at least one policy attribute of the at least one child resource group be as restrictive as the plurality of management policies specified in the at least one policy attribute of the parent of the plurality of resource groups.

12. The system of claim 11, wherein the group manager module is further adapted for performing at least one of:
restricting the authority to create the plurality of resource groups without a parent of the plurality of resource groups to a user ID having a user resource scope attribute that provides access to at least one of the plurality of resources groups,
limiting the authoring of performing one of creating and modifying the at least one child resource group containing the resource group label attribute matching a scope of the users resource scope attribute to the user ID having one of the plurality of resource groups that does not provide access to all resource groups, and
limiting the user ID having one of the plurality of resource groups without authority to provide access to the at least one of the plurality of resource groups to one of:
changing the plurality of resource groups of the plurality of storage resources that is associated with the plurality of resource groups having the resource group label attribute matching the user resource scope attribute and is being assigned to one of the plurality of resource groups having the resource group label attribute that matches the user resource scope attribute.

13. The system of claim 8, wherein the group manager module is further adapted for performing at least one of:
defining at least one policy attribute of the plurality of resource groups that prevents at least one of creating and associating a specified storage resource class in the plurality of resource groups, and
defining a policy attribute of the plurality of resource groups that prevents a creation of a child resource group.

14. The system of claim 8, wherein the group manager module is further adapted for assigning an authority to an administrative user ID to create at least one user ID with a definition that provides an authority to create another one of the at least one user ID with the user resource scope attribute that is limited by the user resource scope attribute of creating one of the at least one user ID with a user role that is limited to at least one of a set of the user roles assigned to the creating one of the at least one user ID.

15. A computer program product for establishing hierarchical user management authority for storage resources organized into a plurality of resource groups in a computing storage environment by a processor device, the computer program product comprising a non-transitory computer-readable storage medium having computer-readable program code portions stored therein, the computer-readable program code portions comprising:
 a first executable portion for associating the plurality of storage resources with a resource group object, the resource group object and a storage resource object by having a resource group attribute associating the storage resource object with one of the plurality of resource groups;
 a second executable portion for assigning a resource group label attribute to the resource group object;
 a third executable portion for defining at least one additional attribute of the resource group object that specify a plurality of management policies for the resource group object and the plurality of storage resources associated with the resource group object;
 a fourth executable portion for associating at least one of a plurality of available users of the plurality of storage resources with a user resource scope attribute;
 a fifth executable portion for defining a schema for comparing of a plurality of values of the user resource scope attribute with the resource group label attribute, wherein the at least one of the plurality of available users having authority to perform one of creating, modifying, delete, and managing the plurality of storage resources associated with the at least one of the plurality of resource groups and also authority to perform one of creating and modifying at least one of the plurality of resource groups;
 a sixth executable portion for designating the resource group label attribute as a delimited text string for assigning the resource group label attribute to the resource group object;
 a seventh executable portion for designating the resource group label attribute as a delimited text string further includes designating the resource group label attribute with at least one resource group qualifier sections, separated by a delimiter symbol;
 an eighth executable portion for designating the user resource scope attribute as a delimited text string further includes designating the user resource scope attribute with the at least one resource group qualifier sections, separated by at least one delimiter symbol, wherein the a least one delimiter symbol may include a wild card symbol; and
 a ninth executable portion for defining a schema for comparing of a plurality of values of the user resource scope attribute with the resource group label attribute further includes comparing the at least one resource group qualifier sections to match with a corresponding one of the at least one resource group qualifier sections, wherein a last one of the at least one resource qualifier sections is considered to match any subsequent one of the at least one resource group qualifier sections if a wildcard symbol is specified as a last character.

16. The computer program product of claim 15, further including a tenth executable portion for performing at least one of:
 associating at least one of the plurality of available users with the user resource scope attribute further includes designating the user resource scope attribute as the delimited text string, wherein at least one symbol is designated with at least one wildcard characteristic, and
 defining a schema for comparing of a plurality of values of the user resource scope attribute with the resource group label attribute further includes considering a user to have authority to manage the plurality of storage resources associated with at least one of the plurality of resource groups if a text pattern specified by the user resource scope attribute matches the delimited text string specified in the resource group label of the resource group.

17. The computer program product of claim 15, further including a tenth executable portion for performing at least one of:
 associating with the at least one resource group qualifier sections with an independent hierarchical domain for a specific management purpose, and
 associating with the at least one resource group qualifier sections with a user management hierarchy, wherein at least one value of the at least one resource group qualifier sections specifies a different node in the user management hierarchy.

18. The computer program product of claim 15, further including a tenth executable portion for performing at least one of:
 assigning a parent resource group attribute to at least one of the resource group object that identifies another one of the plurality of resource groups as a parent of the plurality of resource groups such that a specified one of the plurality of resource groups may be hierarchically related to at least one child resource group,
 constraining the resource group label attribute of the parent of the plurality of resource groups and the at least one child resource group such that a resource scope may be defined to match a subset of a set of the plurality of resource groups consisting of at least one of the plurality of resource groups and at least one of the descendants of the plurality of resource groups, and
 requiring the plurality of management policies specified in at least one policy attribute of the at least one child resource group be as restrictive as the plurality of management policies specified in the at least one policy attribute of the parent of the plurality of resource groups.

19. The computer program product of claim 18, further including an eleventh executable portion for performing at least one of:
 restricting the authority to create the plurality of resource groups without a parent of the plurality of resource groups to a user ID having a user resource scope attribute that provides access to at least one of the plurality of resources groups,
 limiting the authoring of performing one of creating and modifying the at least one child resource group containing the resource group label attribute matching a scope of the users resource scope attribute to the user ID having one of the plurality of resource groups that does not provide access to all resource groups, and
 limiting the user ID having one of the plurality of resource groups without authority to provide access to the at least one of the plurality of resource groups to one of:

changing the plurality of resource groups of the plurality of storage resources that is associated with the plurality of resource groups having the resource group label attribute matching the user resource scope attribute and is being assigned to one of the plurality of resource groups having the resource group label attribute that matches the user resource scope attribute.

20. The computer program product of claim 15, further including a tenth executable portion for performing at least one of:

defining at least one policy attribute of the plurality of resource groups that prevents at least one of creating and associating a specified storage resource class in the plurality of resource groups, and defining a policy attribute of the plurality of resource groups that prevents a creation of a child resource group.

21. The computer program product of claim 15, further including a tenth executable portion for performing at least one of:

assigning a plurality of user IDs to the plurality of available users, and expanding the plurality of user IDs to create at least one child resource group, wherein the plurality of user IDs may be lower or higher in the hierarchy of the plurality of available users in order to expand a resource group hierarchy within a plurality of parent policies.

* * * * *